(12) United States Patent
Nashida et al.

(10) Patent No.: US 6,978,472 B1
(45) Date of Patent: Dec. 20, 2005

(54) INFORMATION PROVIDING DEVICE AND METHOD

(75) Inventors: Tatsushi Nashida, Kanagawa (JP); Takeshi Hashimoto, Tokyo (JP); Motoki Kobayashi, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/601,161

(22) PCT Filed: Nov. 30, 1999

(86) PCT No.: PCT/JP99/06708

§ 371 (c)(1),
(2), (4) Date: Sep. 6, 2000

(87) PCT Pub. No.: WO00/33566

PCT Pub. Date: Jun. 8, 2000

(30) Foreign Application Priority Data

Nov. 30, 1998 (JP) .............................. P10-338632

(51) Int. Cl.[7] .......................................... H04N 4/445
(52) U.S. Cl. ......................... 725/52; 725/41; 348/734
(58) Field of Search ............................... 725/37–39, 41, 725/44, 46, 59, 52, 466; 348/734; 345/854; 715/854, 716

(56) References Cited

U.S. PATENT DOCUMENTS

| | | | |
|---|---|---|---|
| 5,068,734 A | * | 11/1991 | Beery ........................ 348/734 |
| RE34,611 E | * | 5/1994 | Fenwick et al. .............. 725/93 |
| 5,485,197 A | * | 1/1996 | Hoarty ........................ 725/37 |
| 5,596,373 A | * | 1/1997 | White et al. ................. 348/569 |
| 5,724,106 A | * | 3/1998 | Autry et al. ................. 348/734 |
| 5,956,025 A | * | 9/1999 | Goulden et al. ............ 345/716 |
| 5,977,974 A | * | 11/1999 | Hatori et al. ................ 345/839 |
| 6,016,144 A | * | 1/2000 | Blonstein et al. ........... 345/791 |
| 6,118,493 A | * | 9/2000 | Duhault et al. ............. 348/564 |
| 6,219,837 B1 | * | 4/2001 | Yeo et al. .................... 725/38 |
| 6,405,371 B1 | * | 6/2002 | Oosterhout et al. .......... 725/39 |
| 2005/0010947 A1 | * | 1/2005 | Ellis ........................... 725/38 |

FOREIGN PATENT DOCUMENTS

| | | |
|---|---|---|
| JP | 7-115690 | 5/1995 |
| JP | 9-37169 | 2/1997 |
| JP | 10-260671 | 9/1998 |

* cited by examiner

Primary Examiner—John Miller
Assistant Examiner—John Manning
(74) Attorney, Agent, or Firm—Frommer Lawrence & Haug LLP; William S. Frommer; Samuel S. Lee

(57) ABSTRACT

The present invention relates to an information providing apparatus and an information providing apparatus. The display screen is switched to a predetermined display screen and receives processing on this predetermined display screen by operation of another operation key. Thus, in case where the present invention is applied to a set-top box for digital satellite broadcasting or the like to provide a large number of programs by various selection methods, the number of operation keys of a remote control device is prevented from being increased, so the operationality can be improved.

6 Claims, 35 Drawing Sheets

MOVIE

[10/7 8:00] CRIMINAL MISSION No.1

[10/7 8:10] DR. JEKYLL AND MR. HYDE

[10/7 9:10] MYSTERY THEATER 2000

[10/7 10:00] QUEEN★

[10/7 10:00] GUN MEN/BALLADE FOR WOLVES

[10/7 10:35] MYSTERY THEATER 2000

[10/7 12:00] DEEP SLEEP FOR THEM

[10/7 12:40] DR. JEKYLL AND MR. HYDE

[10/7 14:00] DOLL OF KID

[10/7 14:20] DEEP SLEEP FOR THEM

FIG. 17

INFORMATION PROVIDING DEVICE AND METHOD

TECHNICAL FIELD

The present invention relates to an information providing apparatus and an information providing method which can be applied to, for example, a set-top box for digital satellite broadcasting. Also, the present invention relates to an information providing apparatus and an information providing method which prevent increase of the number of operation keys and improve operationality in a manner in which a predetermined display screen is displayed only while a first operation key is operated and processing on the predetermined display screen is received by an operation of another operation key, in case where a number of programs are provided by various methods.

BACKGROUND ART

Conventionally, in a set-top box and the like for digital satellite broadcasting, contents and the like of broadcastings on respective channels are displayed, for example, on a multi-screen in order that a desired channel can be selected easily from a large number of channels.

In this kind of video apparatus, for example, it is considered that not only broadcasting programs but also programs based on various media can be provided by connecting a recording/reproducing device such as an optical disk device, a hard disk device, or the like. It is also considered that the number of broadcasting programs will increase.

Since information to be provided thus increases, the operationality of this kind of information apparatuses can be improved if required information can be rapidly and accurately selected.

In this case, if information is not selected simply by classification based on broadcasting channels, media, and the like as in a conventional apparatus but it is possible to approach desired information by various selectable methods as required, the operationality can be much more improved in case of selecting desired information from a large amount of information as described above.

However, as more and more measures for selecting information are provide, the number of operation keys increases in a remote commander as a remote control device, so that the operationality may be deteriorated inversely.

DISCLOSURE OF THE INVENTION

The present invention has been made in view of the above problems and has an object of providing an information providing apparatus and an information providing method which are capable of preventing increase of the number of operation keys of a remote control device in case where a large number of information selection means are provided.

An information providing apparatus according to the present invention has input means inputted with a remote control signal outputted from a wireless remote control device, switches a display screen in response to the remote control signal, to provide various information by selection on a predetermined menu screen, and comprises: first determination means for determining whether or not a first operation key is operated on the remote control device; screen switching means for switching the display screen from a first display screen to a second display screen if the first determination means determines that the first operation key is operated, and for displaying the second display screen while the first operation key is operated; and second determination means for determining whether or not the second operation key is operated while the first operation key is operated, characterized in that if the second determination means determines that the second operation key is operated while the first operation key is operated, processing based on operation of the second operation key is received on the second display screen.

In the information providing apparatus according to the present invention, the screen switching means switches the display screen from the second display screen to the first display screen, if the first determination means determines that a stated where the first operation key is not operated is changed into a state where the first operation key is operated.

Also the information providing apparatus according to the present invention further comprises: layer screen display means for displaying at least a screen in a first layer and a screen in a second layer lower than the first layer; and layer switching means for switching the screen in the first layer and the screen in the second layer each other, based on a control signal from the remote control device, characterized in that the first display screen is the screen in the second layer, and the display screen is switched from the screen in the second layer to the second display screen if the first determination means determines that the first operation key is operated, and when the display screen is the screen in the first layer, the display screen is switched from the screen in the first layer to a third display screen if the first determination means determines that the first operation key is operated.

In the information providing apparatus according to the present invention, the remote control device includes a grip part which can be gripped by one hand, first operation means provided at a position where the first operation means can be operated by a thumb finger when the grip part is gripped by one hand, and second operation means provided at a position where the second operation means can be operated by a forefinger when the grip part is gripped by one hand, and the first operation key is the first operation means and the second operation means is the second operation key.

Further, the information is a series of video information based on a video signal, and the second display screen is a screen on which index images for guiding scenes of a series of a video based on the video signal are arranged in time series.

Next, an information providing method according to the present invention includes input means inputted with a remote control signal outputted from a wireless remote control device, switches a display screen in response to the remote control signal, to provide various information by selection on a predetermined menu screen, and comprises: a first determination step of determining whether or not a first operation key is operated on the remote control device; a screen switching step of switching the display screen from a first display screen to a second display screen if it is determined in the first determination step that the first operation key is operated, and of displaying the second display screen while the first operation key is operated; and a second determination step of determining whether or not the second operation key is operated while the first operation key is operated, characterized in that if it is determined in the second determination step that the second operation key is operated while the first operation key is operated, processing based on operation of the second operation key is received on the second display screen.

In the information providing method according to the present invention, if it is determined in the first determination step that a state where the first operation key is operated is changed into a state where the first operation key is not operated, the display screen is switched from the second display screen to the first display screen in the screen switching step.

Also, the information providing method according to the present invention further comprises: a layer screen display step of displaying at least a screen in a first layer and a screen in a second layer lower than the first layer; and a layer switching step of switching the screen in the first layer and the screen in the second layer each other, based on a control signal from the remote control device, characterized in that the first display screen is the screen in the second layer, and the display screen is switched from the screen in the second layer to the second display screen if it is determined in the first determination step that the first operation key is operated, and when the display screen is the screen in the first layer, the display screen is switched from the screen in the first layer to a third display screen if it is determined in the first determination step that the first operation key is operated.

Also, in the information providing method according to the present invention, the remote control device includes a grip step of gripping a grip part by one hand, a first operation step of operating the first operation key provided at a position where the first operation key can be operated by a thumb finger when the grip part is gripped by one hand, and a second operation step of operating the second operation key provided at a position where the second operation key can be operated by a forefinger when the grip part is gripped by one hand.

Further, in the information providing method according to the present invention, the information is a series of video information based on a video signal, and the second display screen is a screen on which index images for guiding scenes of a series of a video based on the video signal are arranged in time series.

BRIEF DESCRIPTION OF THE DRAWINGS

FIG. 17 is a plane view showing a program guide in the category.

BEST MODE FOR CARRYING OUT THE INVENTION

In the following, embodiments of the present invention will be described in details with reference to appropriate drawings.

(1) Structure of Embodiments (1-1) Entire Structure

Figure 1:
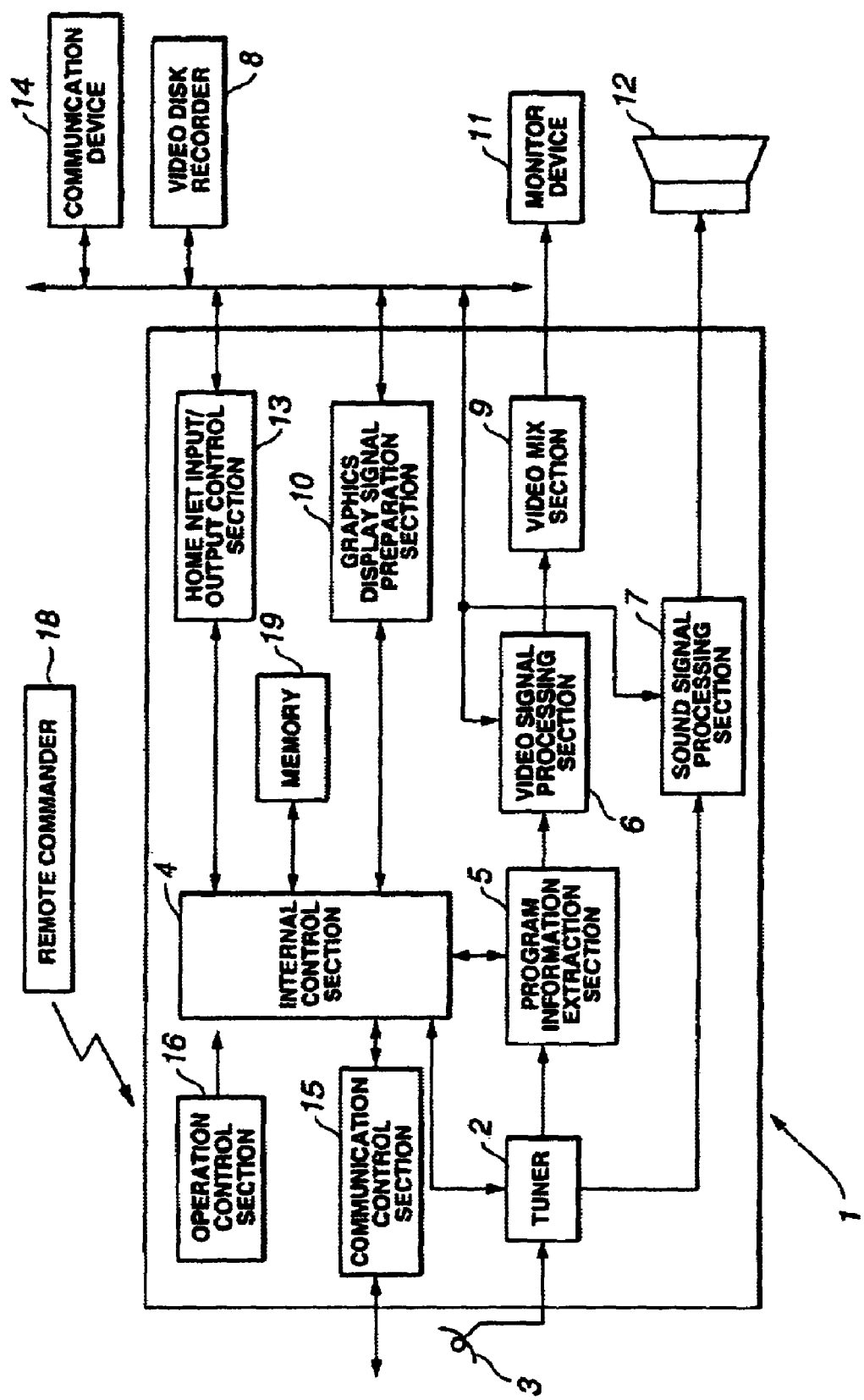
FIG. 1 is a block diagram showing a set-top box according to an embodiment of the present invention.

FIG. 1 is a block diagram showing a set-top box according to an embodiment of the present invention. In this set-top box 1, a tuner 2 receives broadcasting waves of digital satellite broadcasting which is down-converted through an antenna 3, and demodulates a desired transport stream from these broadcasting waves. Further, the tuner 2 demodulates image data and sound data from the transport stream and outputs the data together with an electronic program guide (EPG).

A program information extraction section 5 extracts electronic program information from the output data from the tuner 2, and outputs the information to the internal control section 4, as well as the image data and sound data to a video signal processing section 6 and a sound signal processing section 7, respectively.

Under control by the internal control section, the video signal processing section 6 expands and outputs the image data outputted from the program information extraction section 5 and image data which is inputted from a video disk recorder 8 as an external device. In this case, the image data is transmitted inform of a data compression format according to MPEG (Moving Picture Experts Group), for example.

Also, under control by the internal control section 4, the video signal processing section 6 outputs the image data outputted from the program information extraction section 5 to a video disk recorder 8 in case of recording a desired program by the video disk recorder 8. At this time, the video signal processing section 6 detects a scene change by comparing sequential frames with each other, and outputs the image from which a scene is changed to another (this image will be hereinafter called an index image), as a still image, to the video disk recorder during recording. In this manner, the video signal processing section 6 records an index image of each of scenes constituting a program, onto the video disk recorder 8. Also, the video signal processing section 6 thus notifies the internal control section 4 of time information indicating a relationship between a still image thus recorded and original image data. As a result of this, in the set-top box 1, index images thus recorded are used so that a scene desired by a user can be selected simply.

A video mix section 9 synthesizes the image data outputted from the video signal processing section 6 and image data outputted from a graphics display signal preparation section 10 and outputs the synthesized data to a monitor device 11. In this manner, in the set-top box 1, a desired program can be watched by the monitor device 11, and various menu screens necessary for selection of this program can be viewed with eyes. At this time, under control by the internal control section 4, the video mix section 9 synthesizes and outputs these two image data pieces through processing such as cross-fading or the like, and also synthesizes image data through keying such that an image based on the image data outputted from the video signal processing section 6 is embedded at a part of an image based on image data outputted from the graphics display signal preparation section 10.

The sound signal processing section 7 expands the sound data outputted from the program information extraction section 5 and sound data inputted from the video disk recorder 8 as an external device and outputs the sound data to the speaker 12. In this manner, in the set-top box 1, sound of a desired program can be heard through a speaker 12. Also, under control by the internal control section 4, the sound signal processing section 7 outputs sound data outputted from the program information extraction section 5 to the video disk recorder, linked with the video signal processing section 6, when a desired program is recorded.

The video disk recorder 8 is one of various media which can be connected to the set-top box 1, and a video tape recorder, a compact disk player, a hard disk device, or an optical disk device is applied as the medium.

A home-net input/output control section 13 is a control section of an interface in this set-top box 1 to a home-network constructed by connecting the video disk recorder 8 and the like through an IEEE1394 interface, and controls operation of the video disk recorder 8 under control by the internal control section 4. In this manner, in the set-top box 1, programs based on digital satellite broadcasting and digital ground wave can be recorded into the video disk recorder 8, and programs recorded in the video disk recorder 8 can be watched and heard.

Also, when thus recording programs based on digital satellite broadcasting and digital ground wave broadcasting, the home-net input/output control section 13 records program information, index images, and the like concerning these programs together under control by the internal control section 4, and selectively reproduces the information, index images, and the like under control by the internal control section 4 and notifies the internal control section 4 and the like of them.

Also, the home-net input/output control section 13 notifies the internal control section 4 of detailed program information, data concerning recording reservation, and the like obtained from a predetermined server through a telephone line, in addition to the processing as described above. The section 13 also notifies the internal control section 4 of detailed program information obtained from a CD-ROM attached to the video disk recorder 8. In this manner, the set-top box 1 can obtain detailed program information from various information sources with respect to various programs which can be provided for users.

Under control by the internal control section 4, the graphics display signal preparation section 10 generates and outputs image data through various display screens (which will be described later) with use of information thus obtained. At this time, the graphics display signal preparation section 10 generates image data from index images recorded in the video disk recorder 8 if necessary and outputs the image data to the video mix section 9. In this manner, the set-top box 1 can simply select a program desired by a user.

A communication control section 15 accesses a predetermined accounting center through a telephone line with respect to a program necessary for accounting process under control by the internal control section 4 and executes processing of necessary data exchange. In this manner, a program of a so-called paper view or the like can be watched and heard by the set-top box 1.

An operation control section 16 receives an infrared remote control signal transmitted from a remote commander 18, detects an operation of an operation key provided on an operation panel of the set-top box 1, and then sends a control signal in accordance with the internal control section 4.

Figure 2:
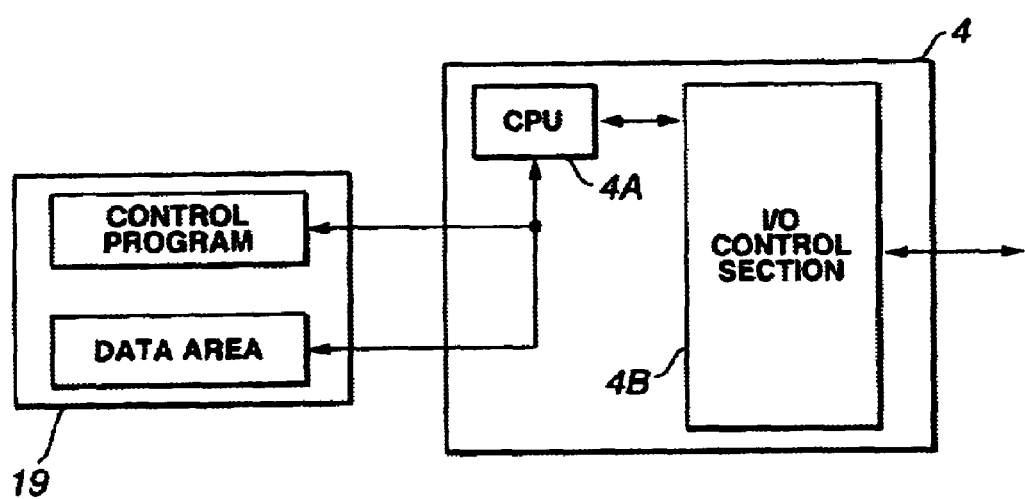
FIG. 2 is a block diagram showing an internal control section of the set-top box shown in FIG. 1.

The internal control section 4 is a micro computer which controls the operation of the set-top box 1 and also controls the operation of the video disk recorder 8 if necessary. This section 4 executes a series of control by executing control programs stored in a memory 19, as shown in FIG. 2.

That is, the memory 19 is comprised of an area where the control programs are stored and an area of a data area as a work area for a central processing unit 4A. The internal control section 4 executes the control programs by the central processing unit 4A and issues control commands to each of circuit blocks as required. Also, the section 4 obtains various data from each of these circuit blocks and controls the entire operation.

In these controls, the internal control section 4 obtains electronic program information outputted from the program information extraction section 5, detailed program information obtained from a server, program information obtained from a CD-ROM attached to the video disk recorder 8, program information provided by an optical disk, and these information pieces concerning a program recorded in the video disk recorder 8, with respect to all programs that can be provided through the monitor device 11 and the speaker 12 connected to the set-top box 1. The internal control section 4 further controls the operation of the graphics display signal preparation section 10 so as to display a menu screen based on program information which totally systematizes the information pieces.

In case of recording a program of digital satellite broadcasting or the like by the video disk recorder 8, the program information pieces obtained as described above are recorded together so that the programs recorded in the video disk recorder 8 can be managed by the program information pieces thus recorded.

In this management of programs, the internal control section 4 unitarily manages these program information pieces so that programs which can be provided by the set-top box 1 can be easily selected, and further receives a selection operation from a user through a layered menu screen.

The internal control section 4 also records a history of programs watched and heard by a user who uses the set-top box 1, and controls the operation of the graphics display signal preparation section 10 such that a favorite channel of the use is displayed to be selectable priorly in accordance with the history.

In this manner, the set-top box 1 displays information of programs provided by media such as broadcasting, an optical disk, and the like, on the screen, and thus constructs an information providing apparatus which provides an information screen as various information.

(1-2) Structure of Remote Commander

Figure 3:
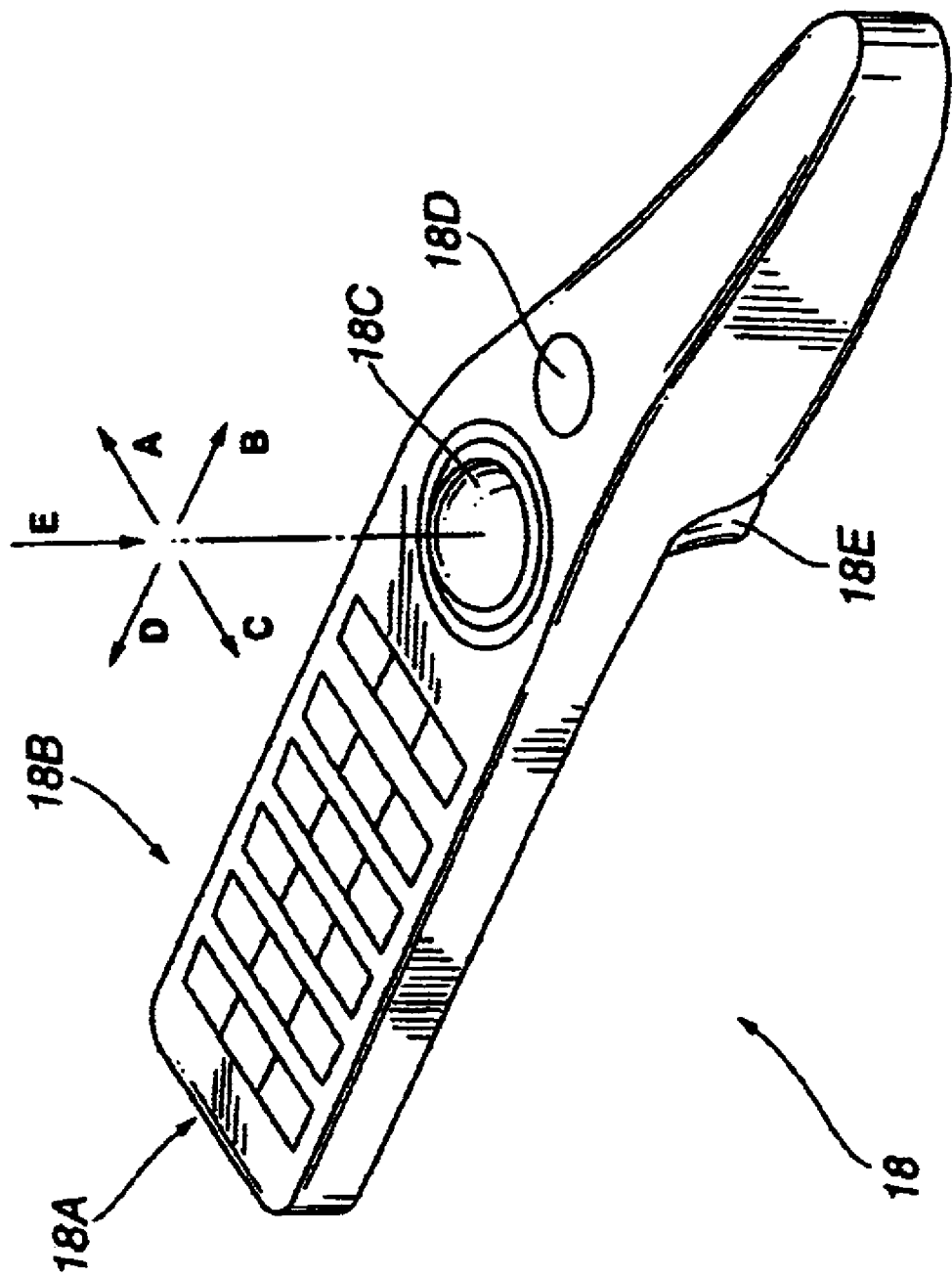
FIG. 3 is a perspective view showing a remote commander of the set-top box shown in FIG. 1.

FIG. 3 is a perspective view showing an outer appearance of the structure of a remote commander. This remote commander 18 is formed in a substantially rod-like shape. A window 18A for transmitting infrared rays is formed on the end surface in the front end side. In the remote commander 18, operation keys 18B such as ten-keys and the like are provided on the upper surface in the top end side, and a desired program can be selected by operating the operation keys 18B.

The upper surface of the remote commander 18 is lowered like a step drawing a smooth curve in the back end side behind the operation keys 18B such as ten-keys and the like, and the remote commander 18 can be gripped at this back end side by one hand. A button 18C having a relatively large diameter is provided at a portion which contacts a thumb when the remote commander 18 is gripped at the back end side with a thumb positioned upside. An operation key 18D for cancellation is provided behind the button 18C.

The button 18C is an operation key for selection and determination and can switches the focus of an icon on the menu screen by operating the button 18C in the up, down, left, and right directions as indicated by arrows A to D. Also, a focused icon can be opened by pressing down this button as indicated by an arrow E. This button 18C is operated in the directions indicated by the arrows A to D and thereby functions as an operation key for making a selection. Therefore, in this case, the button 18C will be hereinafter called a selection operation key. Also, the button 18C is pressed as indicated by the arrow E and functions as an operation key for making a determination. In this case, the button 18C will be hereinafter called a determination operation key. In contrast, the operation key 18D for cancellation is an operation key for returning to a menu screen in a higher layer just above the layer of the screen presently displayed.

Further, the lower surface of the remote commander 18 is lowered like a step such that a forefinger hooks on the lowered step when the remote commander 18 is gripped with a thumb positioned upside. At the portion where the forefinger hooks, a press operation key (called a shift operation key hereinafter) 18E like a gun trigger is provided. In this case, the shift operation key 18E is an operation key which serves to switch the display mode. In this set-top box 1, the display screen can be switched to a screen for program guide or a search screen by operating a predetermined operation key with the shift operation key 18E pressed.

In this manner, in the set-top box 1, the remote commander 18 is gripped by one hand so that a desired program can be selected. Also, if necessary, the shift operation key 18E is pressed with the remote commander 18 gripped by one hand, and the display screen can thus be switched.

Figure 4:
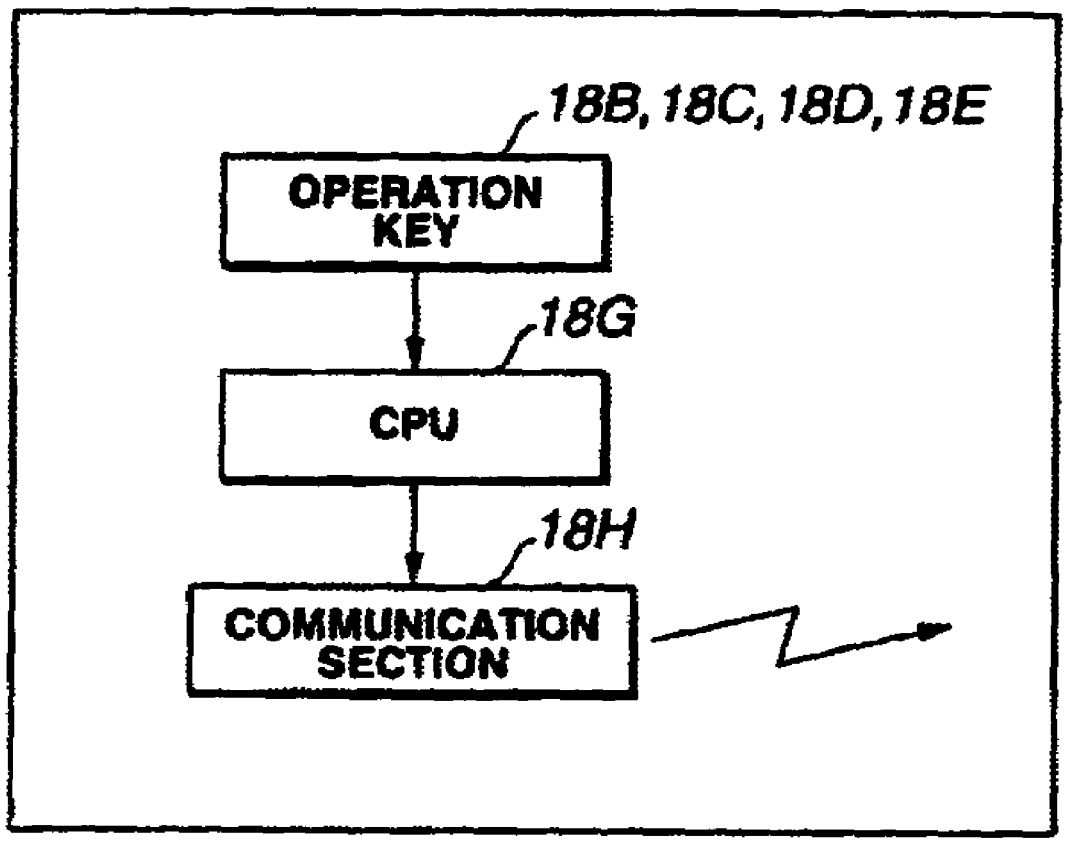
FIG. 4 is a block diagram showing the remote commander shown in FIG. 3.

FIG. 4 is a block diagram showing the remote commander 18. The remote commander 18 detects operations of the operation keys 18B, 18C, 18D, and 18E by the central processing unit (CPU) 18G through a predetermined interface, and drives a transmission section 18H based on the detection result, thereby to transmit an infrared remote control signal. At this time, when other operation keys 18C and 18D are operated with the shift operation key 18E pressed, the central processing unit 18G inserts a remote control signal indicating that the other operation keys 18C and 18D are operated, and sends sequentially a remote control signal indicating press operation on the shift operation key 18E. In this manner, a remote control signal is outputted such that the set-top box 1 can detect that these operation keys are simultaneously operated.

(1-3) Layered Display of Menu Screen

Figure 5:
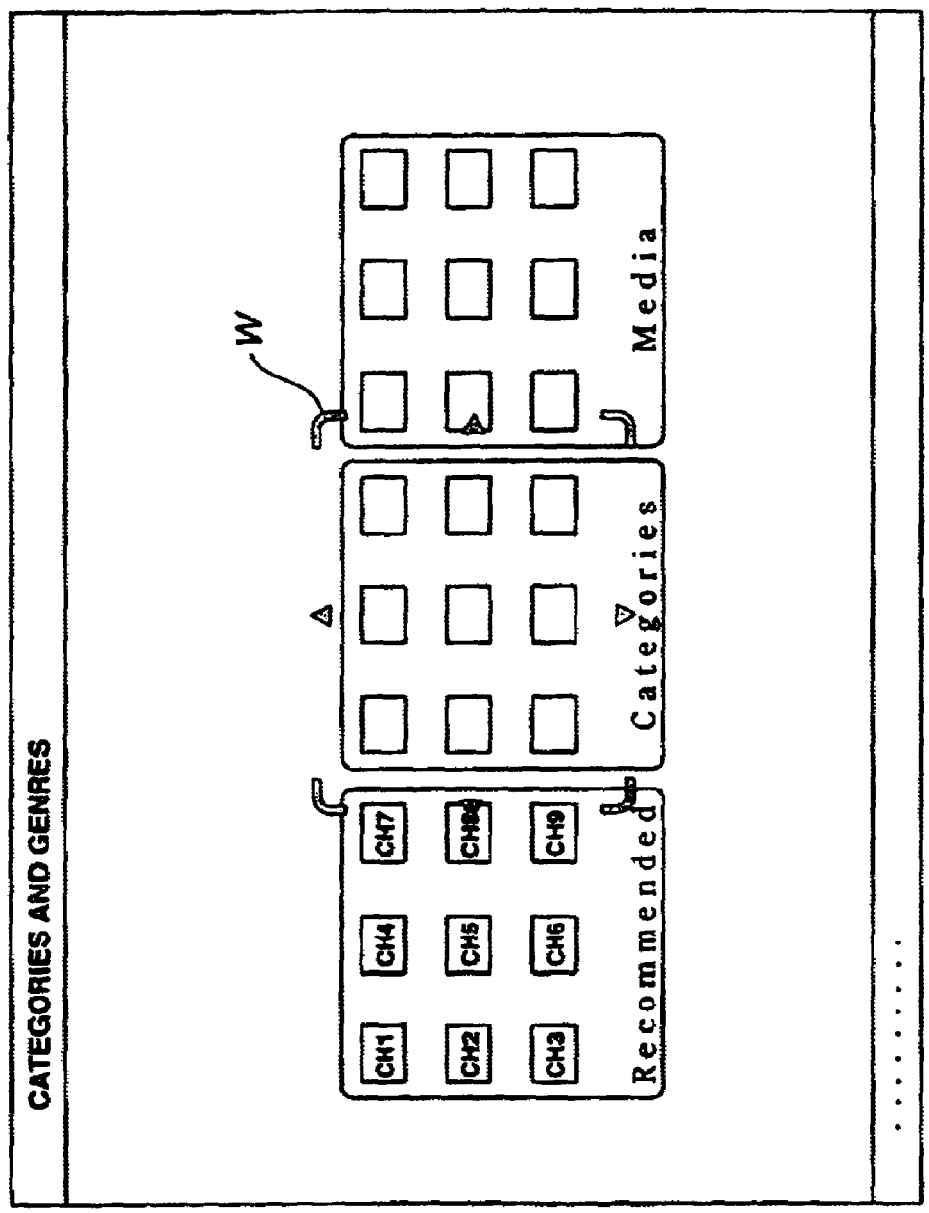
FIG. 5 is a plane view showing a main menu screen.

FIG. 5 is a plane view showing a main menu screen which is displayed on the monitor device 11 by the set-top box 1. When the set-top box 1 is started to operate or in response to an operation on the menu screen in a lower layer below the main menu screen, the internal control section 4 displays the main menu screen. Although each icon is formed with a figure and a text included therein so that the contents of icons can be grasped with eyes, the figures and texts will be partially omitted from the icons shown in the drawings.

In this case, the main menu screen is constructed by a menu of recommended channels (Recommended), a menu of categories (Categories), and a menu of media (Media), each displaying nine icons. The menu of recommended channels (Recommended) is an icon for selecting the menu screen of recommended channels. These recommended channels are virtual channels to which channels that are selected with higher frequencies are assigned among channels that are receivable through the tuner 2, with a past history used as a reference.

In contrast, the menu of categories (Categories) is an icon for opening a menu screen which is classified by categories, and the menu screen classified by the categories is a menu screen for opening programs (including programs recorded in the video disk recorder 8 in addition to the program being presently broadcasted) which can be watched and heard by the set-top box 1, respectively for the categories. Also, the menu of media (Media) is an icon for opening a menu screen for selecting media which can be watched and heard by the set-top box 1.

As a result of this, each menu on the main menu screen is arranged so as to construct an icon for opening a menu screen in a lower layer. A title indicating a menu screen, a channel, or the like presently focused is displayed at an upper portion on each display screen including the main menu screen, and an operation guide, a detailed commentary, or the like is displayed at a lower portion of the screen.

The internal control section 4 controls the graphics display signal preparation section 10 so as to display the menu of categories (Categories) at the center of the main menu and the menus of recommended channels (Recommended) and media (Media) in the left and right sides of the menu of the categories, respectively, in an initial state immediately after the power is turned on. Further, the internal control section displays a frame-like mark W (hereinafter called a mark of focus) so as to surround the menu of categories (Categories) at the center in the initial state, and notifies the user of that the menu (Categories) at the center is presently focused, by the mark W. Note that an arrow indicating the direction in which the selection operation key 18C can be operated is displayed together with the focus mark W, so that the operationality for the user can be improved.

Further, in response to operation of the selection operation key 18C of the remote commander 18 in the left and right directions, the internal control section 4 moves leftward and rightward the entire of the main menu screen including the menu of recommended channels (Recommended), the menu of categories (Categories), and the menu of media (Media) with the focus mark W displayed at the screen center. In this manner, the internal control section 4 switches the focused menu in response to an operation of this selection operation key 18C in the left and right directions. When the display is switched from a menu screen of a lower layer to the main menu screen, the internal control section 4 displays the main menu screen, focusing the menu corresponding to the previous menu screen immediately before the switching.

Thus, according to the present embodiment, the internal control section 4 forms a fixed focus area at the screen center on the menu screen, and scrolls the entire of the menu screen by operation of the operation key 18C, to display an icon of a focus in the focus area. In this manner, in the set-top box 1, movements of the view point are reduced, so that the icon selected by a user can be confirmed easily.

Figure 6:
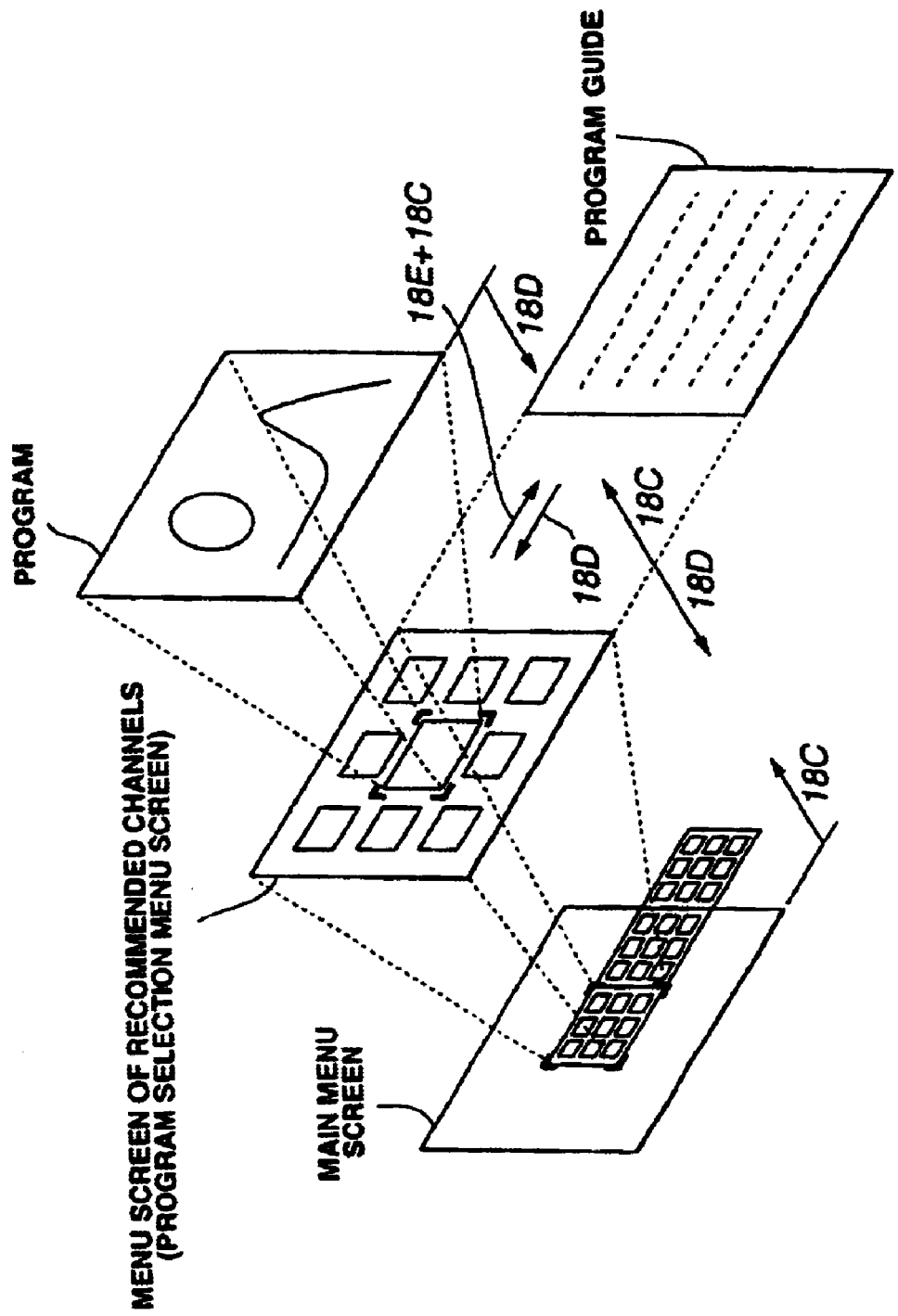
FIG. 6 is a schematic diagram showing a relationship between the main menu screen and menus in a lower layer with respect to recommended channels.

In this respect, FIG. 6 shows a diagram explains a relationship between the main menu screen and menu screens of lower layers with respect to the menu of recommended channels (Recommended). When the determination operation key 18C is pressed with the menu of recommended channels (Recommended) focused, the internal control section 4 opens the menu screen of recommended channels. Further, when the determination operation key 18C is pressed with the menu screen of recommended channels displayed, a program as a lowermost layer is displayed with respect to a channel selected by the menu screen of recommended channels. Inversely, when the cancellation operation key 18D is pressed, the display is switched to menu screens in upper layers sequentially.

In contrast, when the shift operation key 18E and the determination operation key 18C are simultaneously operated with the menu screen of recommended channels displayed, the display screen is switched to a program guide of a focused recommended channel. Further, when the cancellation operation key 18D is pressed on the display screen of this program guide, the display screen returns to the original menu screen of recommended channels. In this manner, in the present embodiment, when the shift operation key 18E and the determination operation key 18C are operated together, a screen different from that in the case where merely the determination operation key 18C is operated is displayed.

Figure 7:
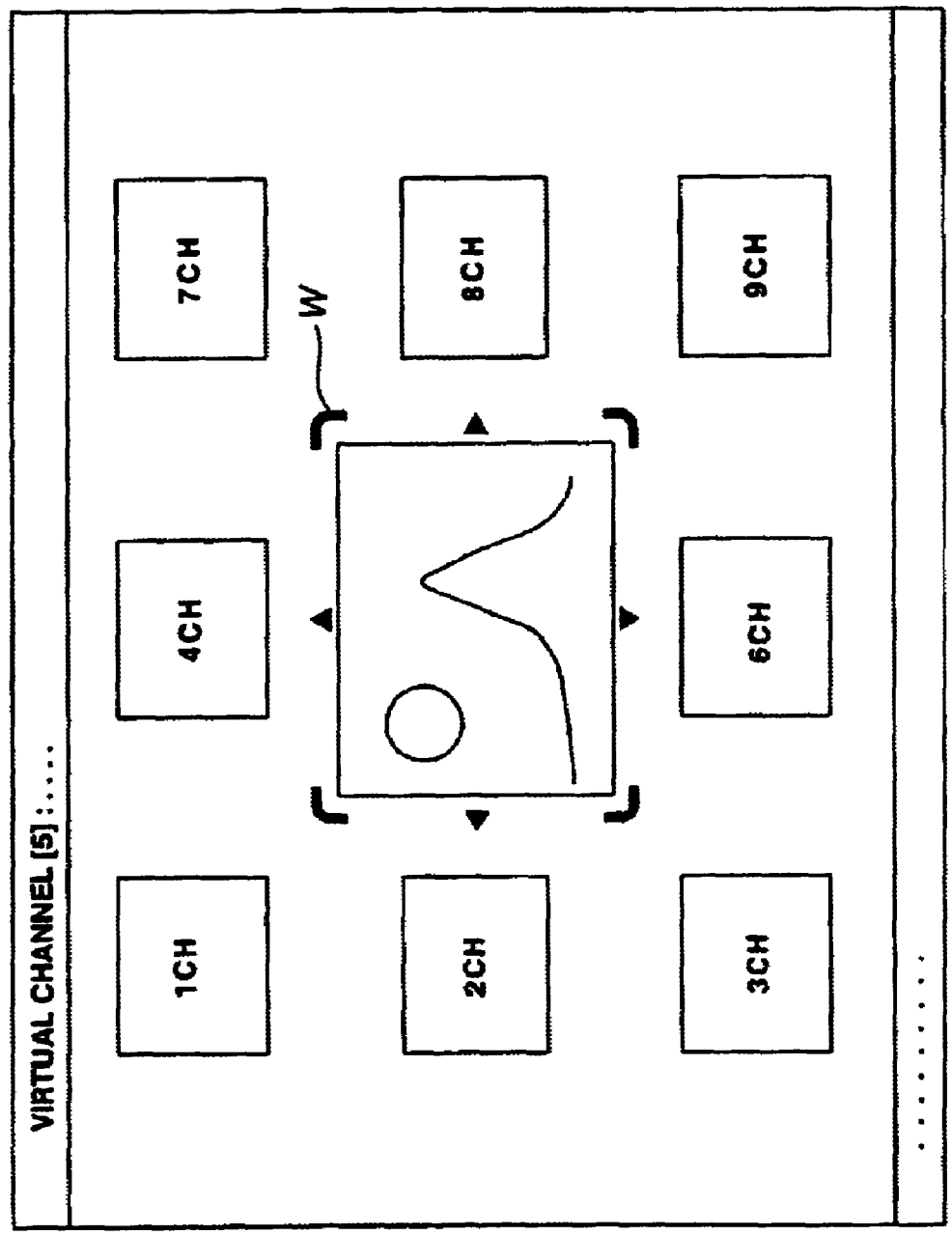
FIG. 7 is a plane view showing a menu screen of the recommended channels shown in FIG. 6.

FIG. 7 is a plane view showing a menu screen of recommended channels, as a menu screen in a lower layer of the menu of recommended channels (Recommended). The internal control section 4 displays eight icons and one child screen in correspondence with the number of recommended channels displayed on the main menu screen, in the menus screen of the recommended channels. The internal control section 4 displays upper nine channels in the order from the highest selection frequency based on the past history, on the initial screen. That is, the internal control section 4 arranges a child screen at the center of the menu screen and displays a program assigned to the virtual channel of the fifth channel as a channel at the center. Also, surrounding this center channel, icons of first to fourth channels (1 ch to 4ch) and icons of sixth to ninth channels (6ch to 9ch) are displayed.

Figure 8A:
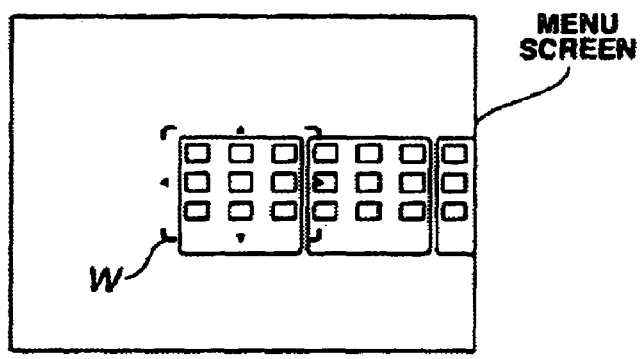
FIGS. 8(A) to 8(C) are plane views used for explaining transit from the main menu screen to the menu screen of recommended channels.
Figure 8B:
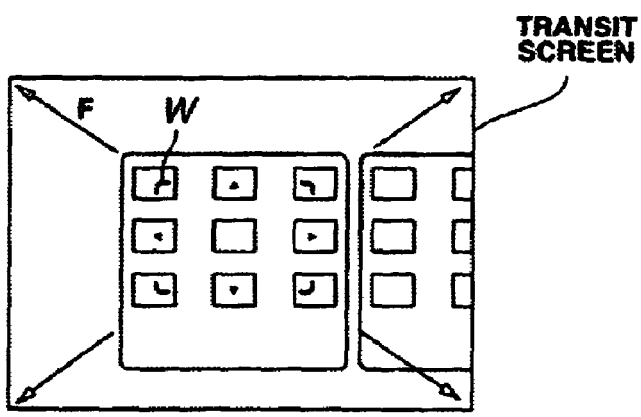
Figure 8C:
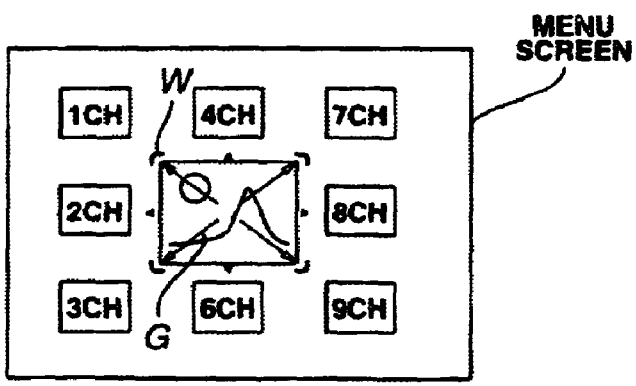

When the display of the menu screen of the recommended channels is switched, the internal control section 4 controls operation of the graphics display signal preparation section 10 such that the display is switched with a predetermined transit screen inserted intermediately. That is, as indicated with the arrow F in FIG. 8, the focused menu is gradually enlarged with the focus mark W kept displayed (FIG. 8(A) and FIG. 8(B)). This menu is enlarged until the initial screen obtains a final size, and then, the icon of the fifth channel at the screen center is surrounded by the focus mark W.

In this manner, the internal control section 4 shifts the display screen so as to zoom in on the icon selected by the user. Subsequently, as indicated by an arrow G the icon of the fifth channel (5ch) surrounded by the focus mark W is gradually enlarged (FIG. 8(C)). The video mix section 9 is instructed of cross-fade processing so that the display of the icon is gradually switched to display of a program assigned to the fifth channel (5ch) as the icon is enlarged.

In this manner, the internal control section 4 finally sets the menu screen of the recommended channels to the display as described above with reference to FIG. 7.

Figure 9A:
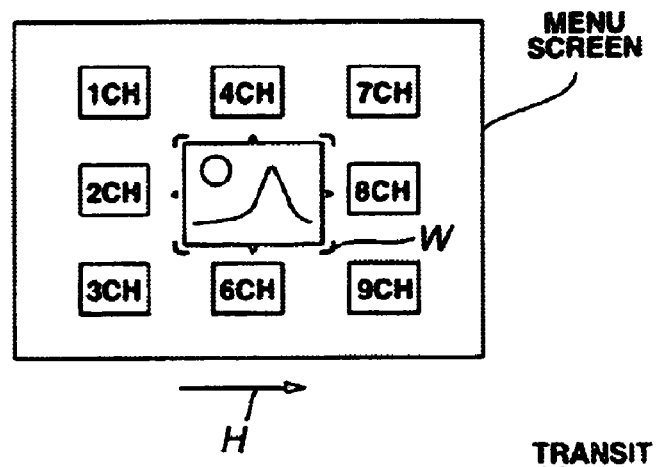
FIGS. 9(A) to 9(C) are plane views used for explaining switching of the focus on the menu screen of recommended channels.
Figure 9B:
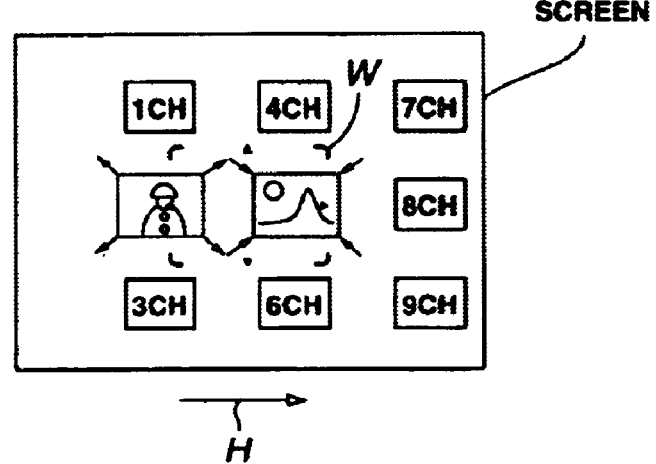
Figure 9C:
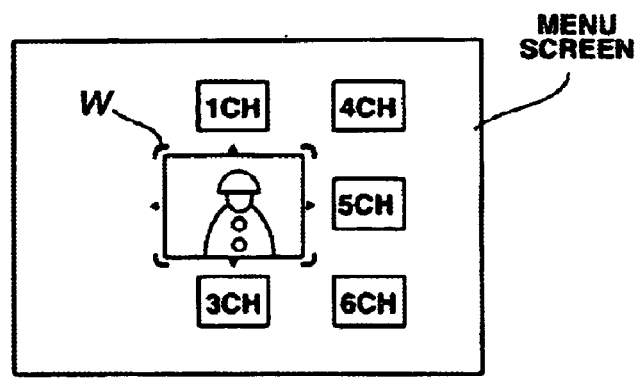
Figure 10A:
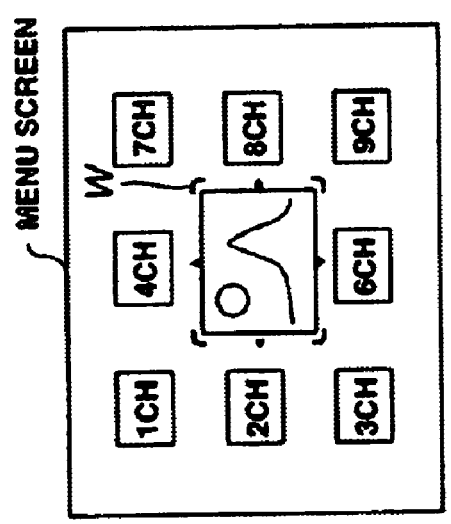
FIGS. 10(A) to 10(D) are plane views used for explaining transit from the main menu of recommended channels to display of a program.
Figure 10B:
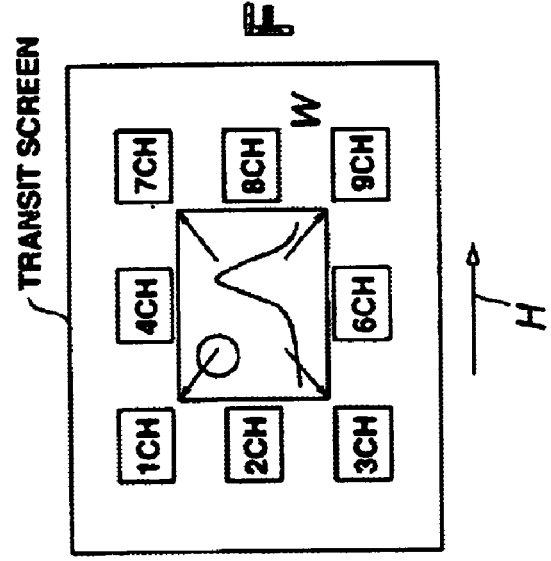
Figure 10C:
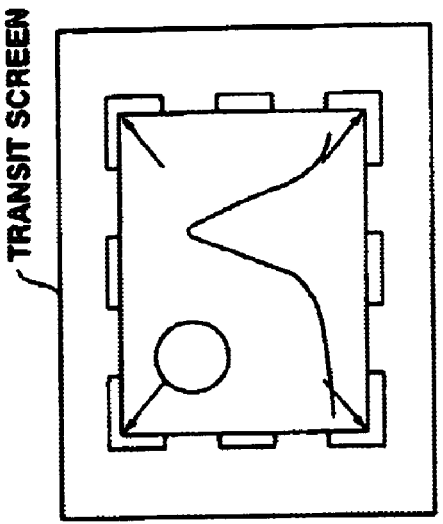
Figure 10D:
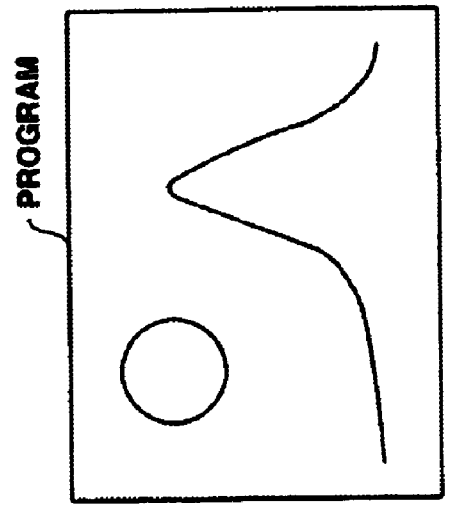

In contrast, when the user operates the selection operation key 18C with the menu screen of recommended channels displayed, the entire menu screen is scrolled as indicated by an arrow H (FIG. 9(A)), with the focus mark W maintained at the screen center, and the focus is switched to the icon surrounded by the mark W having a frame-like shape. At this time, the display which has been surrounded by the focus mark W and has been assigned to a child screen of a program is gradually minified and switched to display of an icon, at the same time when the entire screen is moved. Subsequently, complementarily to this minified display, the display of the icon surrounded by the focus mark W is enlarged gradually, and the icon of the enlarged display is switched to a child screen of a program by cross-fading (FIGS. 9(B) and 9(C)).

On the menu screen of recommended channels thus displayed, the internal control section 4 receives a selection operation of virtual channels from the user through operation of the selection operation key 18C. When the determination operation key 18C is pressed, the display is switched to a focused program. In this case, as shown in FIG. 10, the child screen focused at the screen center is gradually enlarged (FIGS. 10(A) to 10(D)) on the menu screen, and the display of this child screen is finally enlarged over the entire display screen. In this manner, the internal control section 4 can select a program presently broadcasted, by selection operation on the menu screen of virtual channels.

In contrast, when the cancellation operation key 18D is operated with the selected program thus displayed, the display screen is gradually minified to switch the display so as to zoom out onto the original menu screen, on the contrary to the above explanation. At this time, the internal control section 4 zooms out onto the menu screen such that the icon corresponding to the program which has been displayed is surrounded by the focus mark W. In this manner, in the set-top box 1, even in case of transiting to a menu screen in an upper layer, the icon which has been focused can be easily confirmed.

Also, when the user presses the cancellation operation key 18C with the screen of recommended channels displayed, the internal control section 4 gradually minifies the display screen and switches the display so as to zoom out onto the original main menu screen, on the contrary to the above explanation. In this case, the internal control section 4 zooms out onto the main menu screen such that the menu of recommended channels which has been selected is surrounded by the focus mark W at the screen center.

Figure 11:
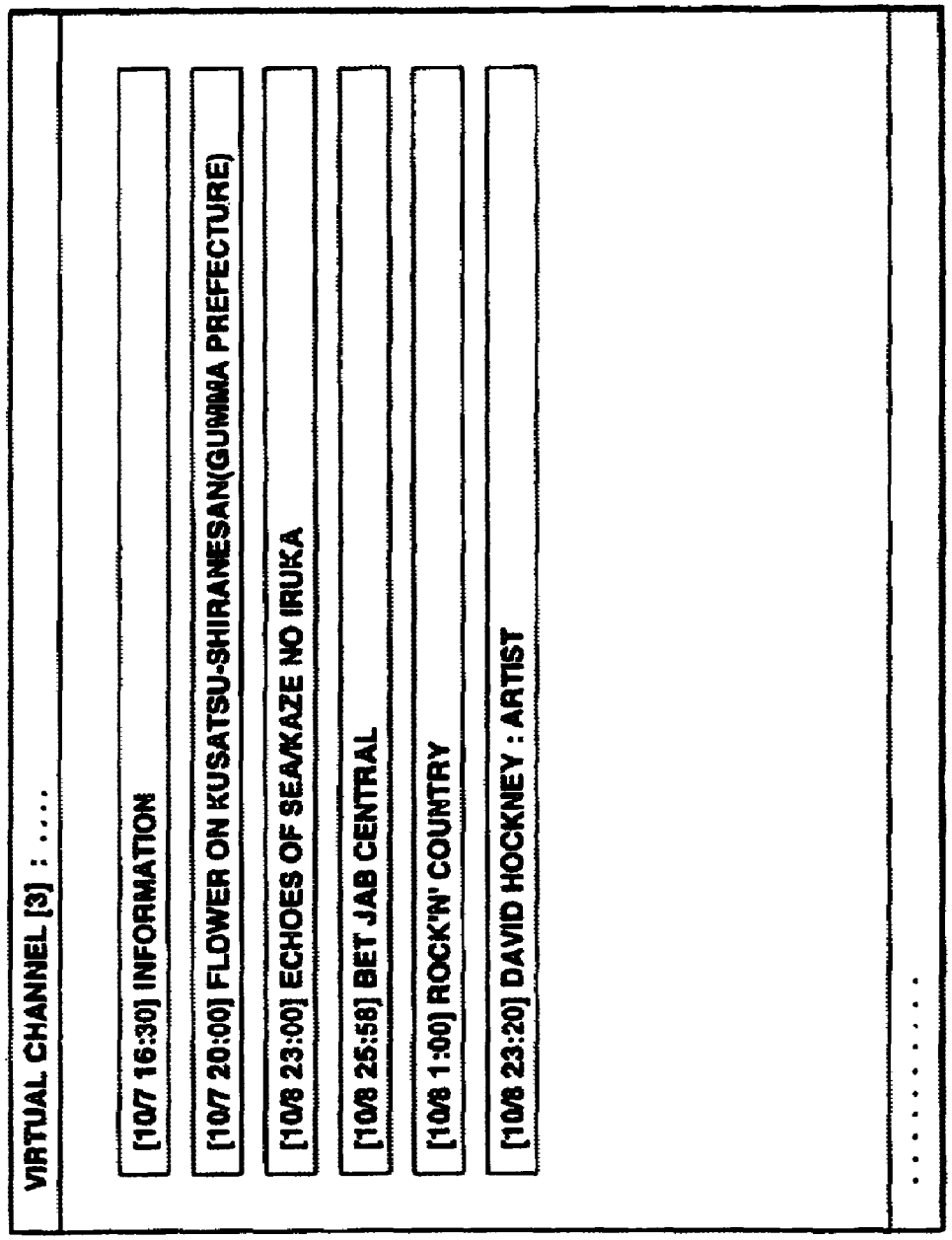
FIG. 11 is a plane view showing a program guide.

FIG. 11 is a plane view showing the screen of a program guide explained above with reference to FIG. 6. This program guide is prepared by arranging guides each of which shows a start time of broadcasting of a program and contents of the program, sequentially from upside. Further, the guides are displayed in different text colors respectively for different categories. In this manner, genres of programs can be confirmed visually with ease.

Figure 12:
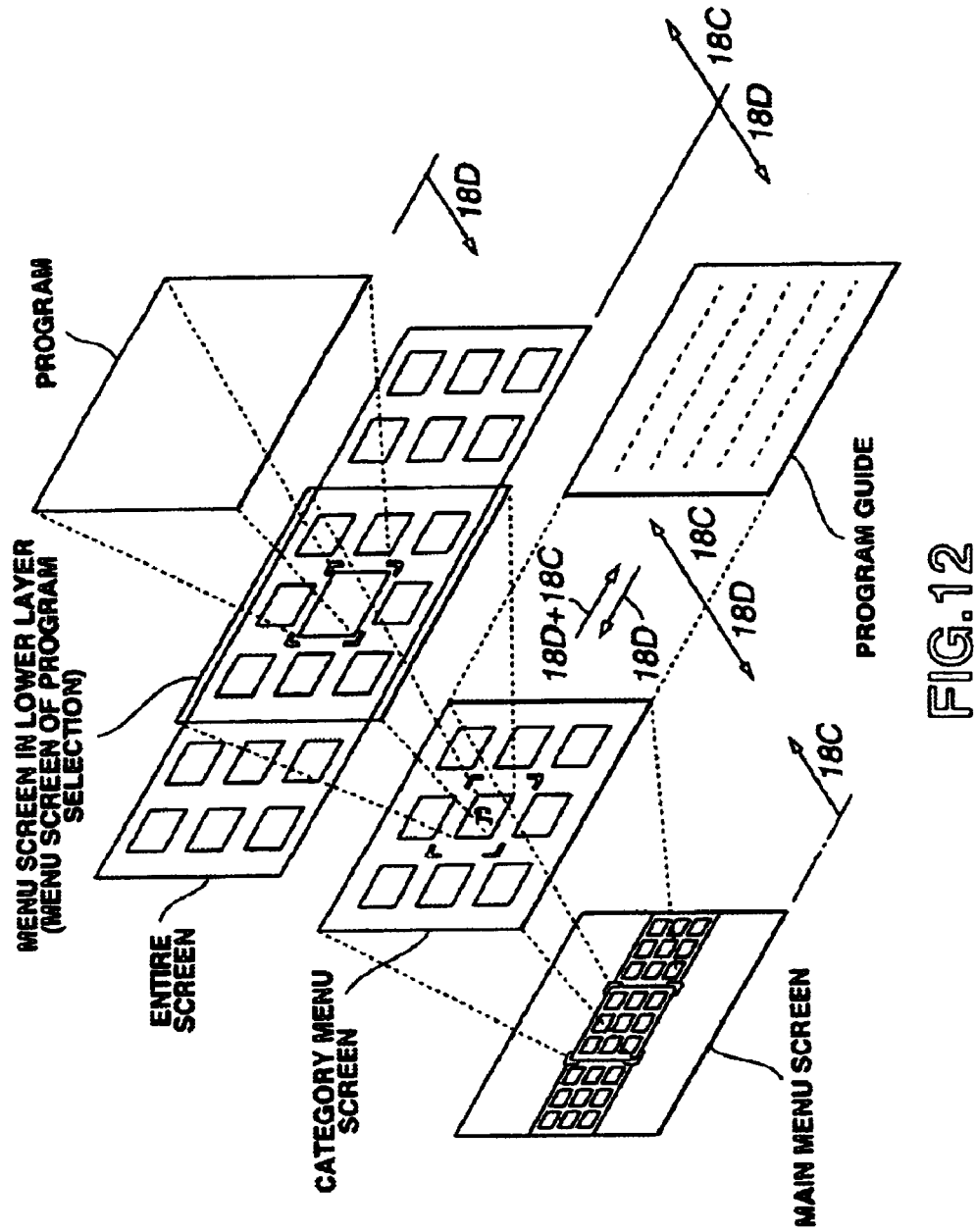
FIG. 12 is a schematic diagram showing a relationship between the main menu screen and menus in a lower layer with respect to categories.

FIG. 12 is a schematic diagram showing a relationship between the main menu screen and menu screens in lower layers, with respect to the menu of categories (Categories) on the main menu screen. When the determination operation key 18C is pressed with the menu screen of the categories focused, the internal control section 4 opens the menu screen of categories. Further, when the determination operation key 18C is pressed with this menu screen of categories displayed, the internal control section 4 shifts the display to a menu screen in a much lower layer with respect to the category selected on the menu screen of categories. Further, when the determination operation key 18C is pressed on the menu screen in this lower layer, the internal control section 4 switches the display to a focused program.

On the contrary to the above, when the cancellation operation key 18D is pressed, the display is switched to a menu screen in an upper layer sequentially.

Further, when the shift operation key 18E and the determination operation key 18C are pressed simultaneously with the menu screen of categories displayed, the display screen is switched to a program guide relating to a focused category. Further, when the cancellation operation key 18D is pressed on the display screen of the program guide, the display screen returns to the original menu screen of categories. In this manner, according to the present embodiment, when the shift operation key 18E and the determination operation key 18C are operated together, a screen different from that in case of operating only the determination operation key 18C is displayed.

Figure 13:
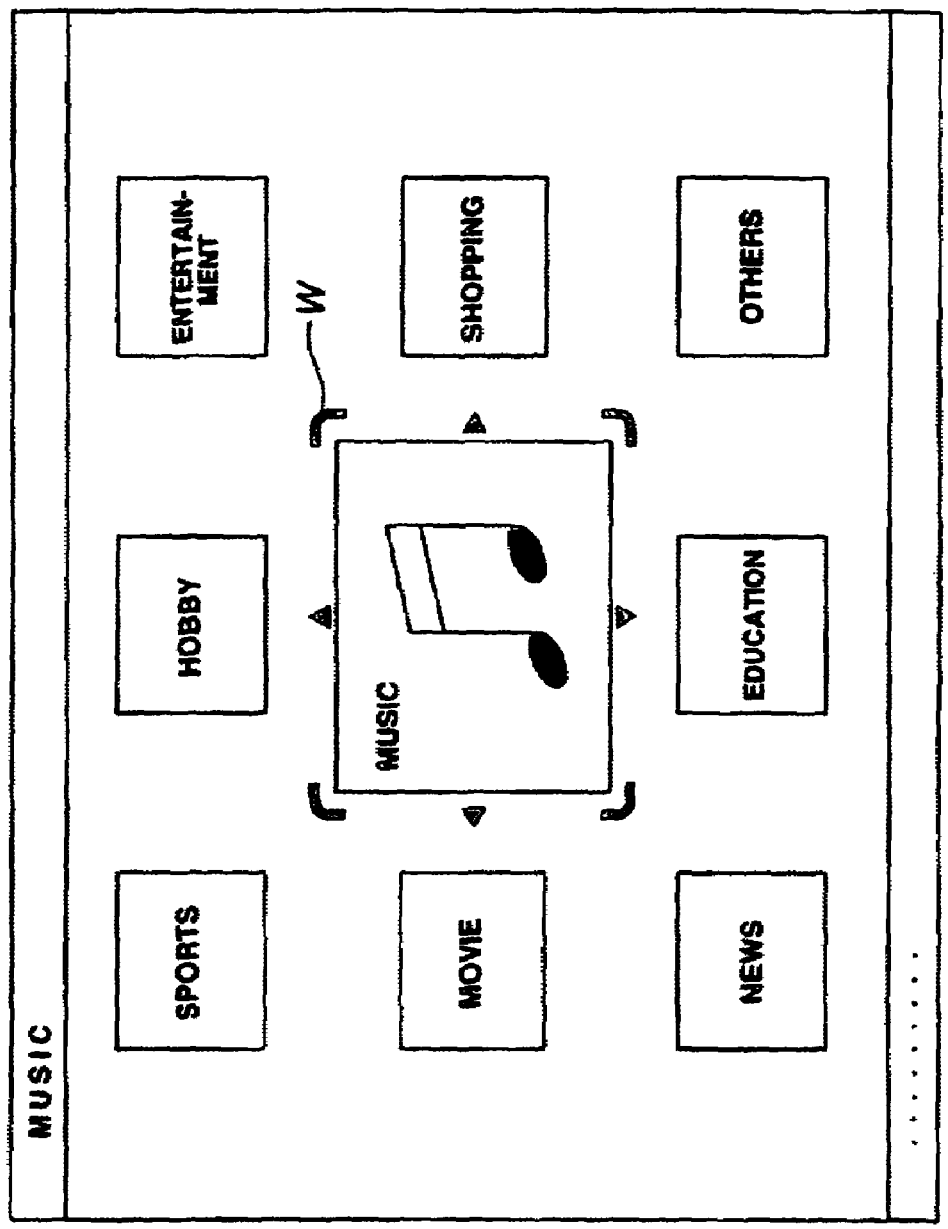
FIG. 13 is a plane view showing a menu screen of categories.

FIG. 13 is a plane view showing the menu screen of categories. The internal control section 4 displays nine icons on this menu screen. Here, the internal control section 4 classifies programs which can be provided by the set-top box 1, into nine categories depending on program information. The menu screen of categories is constructed by nine icons of sports, films, news, hobby, music, education, and the like. On the menu screen, the icon focused in the center of the menu screen is enlarged and displayed.

The internal control section 4 switches the main menu screen to the menu screen of categories, like the case of switching the display to the menu screen of recommended channels from the main menu screen. That is, the internal control section 4 switches the display with a transit screen inserted. On the transit screen, the menu of categories is gradually enlarged such that the display zooms in on this menu of categories, and the icon surrounded by the focus mark W in the center is gradually enlarged (cf. FIG. 8).

In contrast, when the user operates the selection operation key 18C with the menu screen of categories displayed, the entire menu screen is scrolled with the focus mark W maintained at the center of the screen, and the focus is switched to the icon surrounded by the focus mark W, like the case of the menu of recommended channels (cf. FIG. 9). At this time, the display of the icon which has been enlarged on the display is gradually minified at the same time when the entire screen shifts, and subsequently, the display of the icon newly surrounded by the focus mark W is gradually enlarged.

Figure 14:
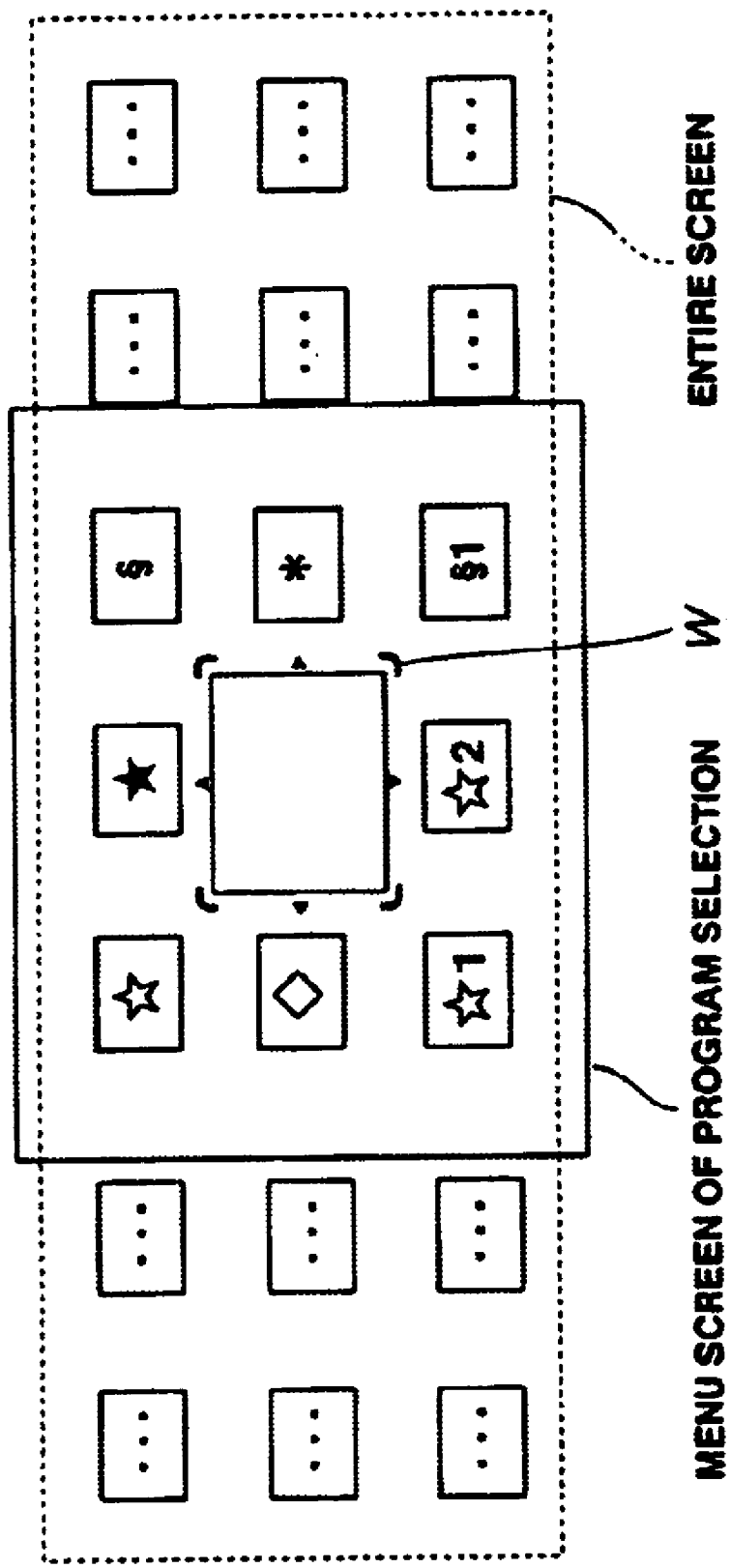
FIG. 14 is a plane view showing a menu screen of program selection in the category.

FIG. 14 is a plane view showing a relationship between the menu screen of program selection in a lower layer corresponding to one icon on the menu screen of categories and all icons grouped into this lower layer. In the present embodiment, the internal control section 4 displays a menu of programs which can be provided with respect to one genre arranged on the menu screen of categories, on the menu screen in the lower layer. At this time, for example, if nine kinds or more of programs can be provided with respect to the music genre corresponding to one icon arranged on the menu of categories, the internal control section 4 assigns icons to all of these programs that can be provided, respectively, and creates an entire screen on which all of these icons are arranged.

The internal control section 4 zooms in on a part of the entire screen to display nine icons, and creates the menu screen of program selection by displaying these nine icons. At this time, with respect to the icon at the screen center, the program as the contents of this icon is displayed in form of a child screen.

Figure 15A:
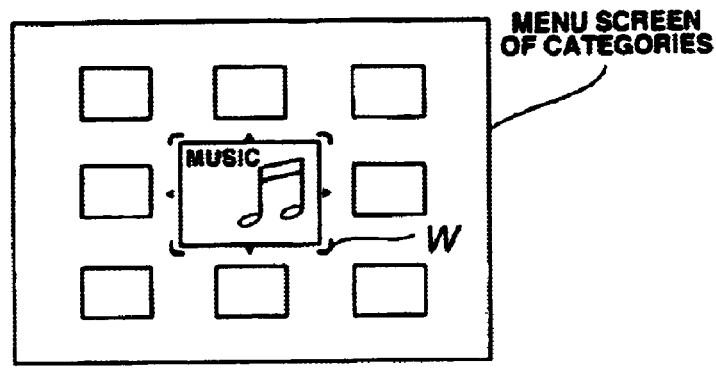
FIGS. 15(A) to 15(C) are plane views used for explaining transit from the main screen of the category to the menu screen of program selection.
Figure 15B:
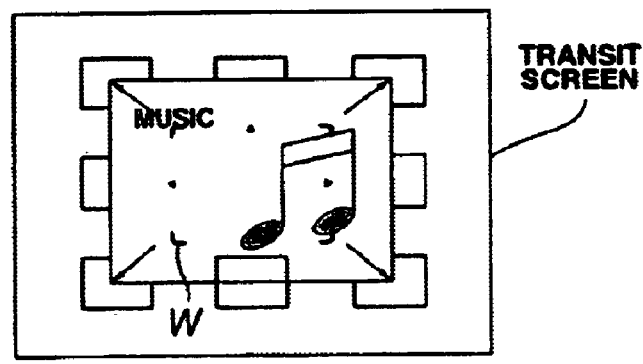
Figure 15C:
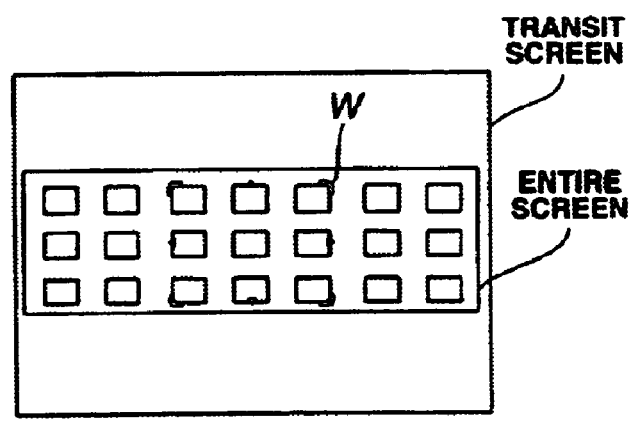

When switching the display from the menu screen of categories to the menu screen of program selection, the internal control section 4 controls the operation of the graphics display signal preparation section 10 such that the display is switched with a predetermined transit screen inserted therebetween. That is, as shown in FIGS. 15 and 16, the focused menu is gradually enlarged with the focus mark W kept displayed (FIGS. 15(A) and 15(B)). When this menu becomes larger than a predetermined value, the display of this icon is rendered gradually transparent so that icons in a lower layer can be viewed with eyes.

Figure 16A:
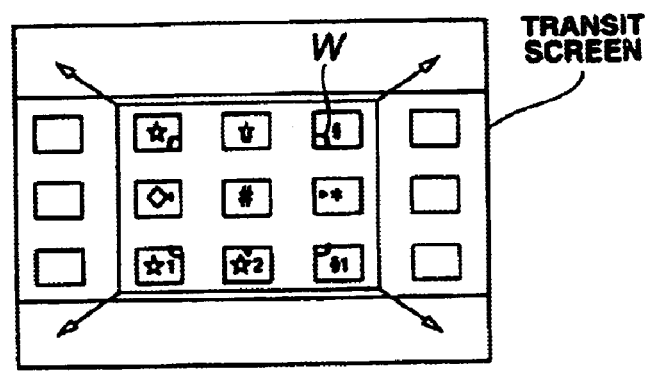
FIGS. 16(A) to 16(B) are plane views used for explanation subsequent to FIG. 15.

Subsequently, the internal control section 4 displays the entire screen described above with reference to FIG. 14 (cf. FIG. 15), and gradually enlarges the entire screen to display the menu screen of program selection (FIGS. 16(A) and 16(B)). In this manner, in the set-top box 1, the entire image of icons which belong to the menu screen of program selection can be grasped visually.

Figure 16B:
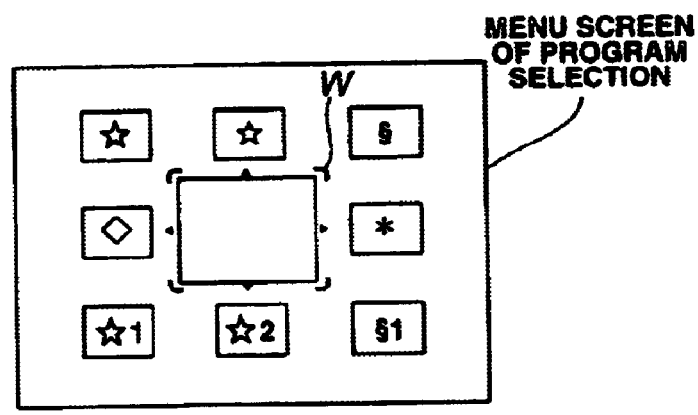

Further, at this time, the icon surrounded by the focus mark W at the center is gradually enlarged, and the display of this icon is switched to a child screen when the icon becomes equal to or larger than a predetermined value (FIG. 16(B)).

In contrast, when the user operates the selection operation key 18C with the menu screen of program selection displayed, the entire menu screen (which is the entire screen displaying all icons in this case) is scrolled, like in the case of the menu screen of recommended channels (cf. FIG. 9), and the focus is switched to the icon surrounded by the focus mark W. At this time, the display of the child screen which has been enlarged, displayed, and surrounded by the focus mark W is switched to display of an icon and is gradually minified, at the same time when the entire screen shifts. Subsequently, the display of the icon surrounded by the focus mark W is gradually enlarged and switched to display of a child screen.

Also, when the determination operation key 18C is pressed on the menu screen of program selection thus displayed, the internal control section 4 switches the display to a focused program. In this case, on the menu screen of program selection, the child screen focused at the screen center is gradually enlarged and displayed (cf. FIG. 10), and the display of this child screen is finally enlarged over the entire display screen.

In contrast, when the cancellation operation key 18C is operated with the selected program thus displayed, the display screen is gradually minified and switched so as to zoom out on the original menu screen of program selection, on the contrary to the above explanation. At this time, the internal control section 4 zooms out onto the menu screen such that the icon corresponding to the program which has been displayed is surrounded by the focus mark W at the screen center.

Also, when the user presses the cancellation operation key 18C with the menu screen of program selection displayed, the internal control section 4 minifies gradually the display screen and switches the display so as to zoom out onto the original menu screen of categories, on the contrary to the above explanation. At this time, on the contrary to the case explained above with reference to FIGS. 15 and 16, the internal control section 4 zooms out from the entire display until the entire screen based on the icon which has been focused is displayed. Thereafter, the section 4 switches to the icon of the corresponding category and zooms out from the icon of this category.

Also, in this case, the internal control section 4 zooms out onto the menu screen of categories such that the icon of the category which has been selected is surrounded by the focus mark at the screen center.

Further, when the user presses the cancellation operation key 18C on this menu screen of categories, the display screen is gradually minified and is switched so as to zoom out onto the original main menu screen, also on the contrary to the above explanation. Also in this case, the internal control section 4 zooms out onto the main menu screen such that the menu of the category which has been selected is surrounded by the focus mark W at the screen center.

FIG. 17 is a plane view showing a screen of a program guide which has been explained with reference to FIG. 12. This program guide is prepared by arranging guides each including a start time of broadcasting of a program and the contents of the program, sequentially from upside. Note that FIG. 17 shows a case where no external device is connected to the network and only those programs that can be obtained through the tuner 2 from the set-top box 1 can be provided.

Figure 18:
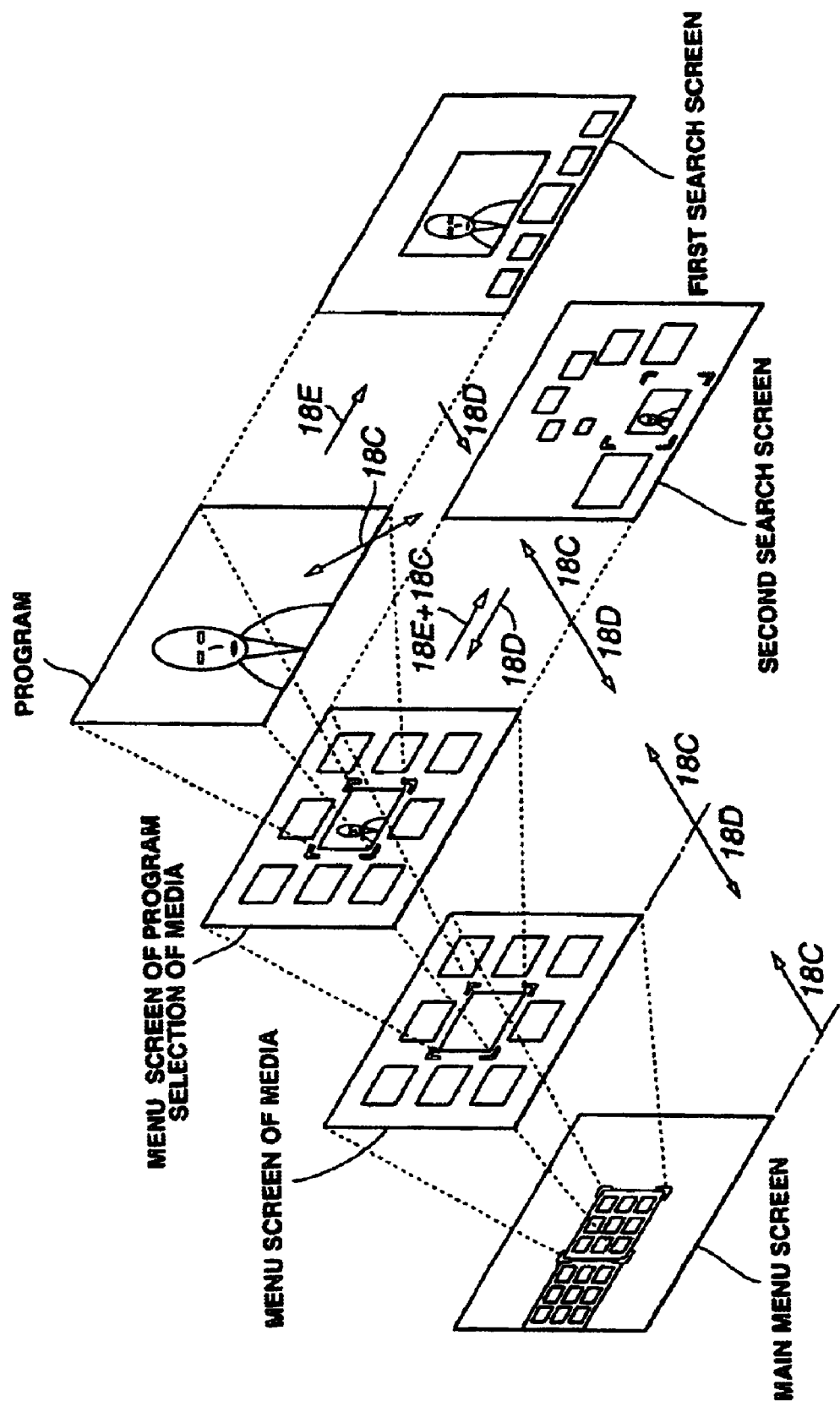
FIG. 18 is a schematic diagram showing a relationship between the main menu screen and menus in lower layers with respect to media.

FIG. 18 is a schematic diagram showing a relationship between the main menu screen and menu screens in lower layers with respect to the menu of media (Media) on the main menu screen. When the determination operation key 18C is pressed with the menu of media (Media) focused on the main menu screen, the internal control section 4 opens the menu screen of media. Further, when a source which records a program is selected with the menu screen of media displayed, the display is switched to a menu screen of program selection as a menu screen in a corresponding lower layer. Further, when the determination operation key 18C is pressed on this menu screen of program selection, the internal control section 4 switches the display to a focused program.

On the contrary to the above, when the cancellation operation key 18D is pressed, the display is switched back to a menu screen in an upper layer sequentially.

Further, when the shift operation key 18E is pressed with a program as the lowermost layer displayed, the operation mode is switched to a first search mode, and the display screen is switched to a corresponding first search screen. When the shift operation key 18E is released, the menu screen of categories displayed, the display screen is switched to the original display of the program.

In contrast, when the determination operation key 18C is pressed with the shift operation key 18E pressed, the operation mode is switched to a second search mode, and the display screen is switched to a corresponding second search screen. In the internal control section 4, when a specific menu such as retrieve or the like is selected on this menu screen of media, a display screen corresponding to aimed processing is displayed by display switching which is different from that of the layer structure explained with reference to FIG. 18.

Figure 19:
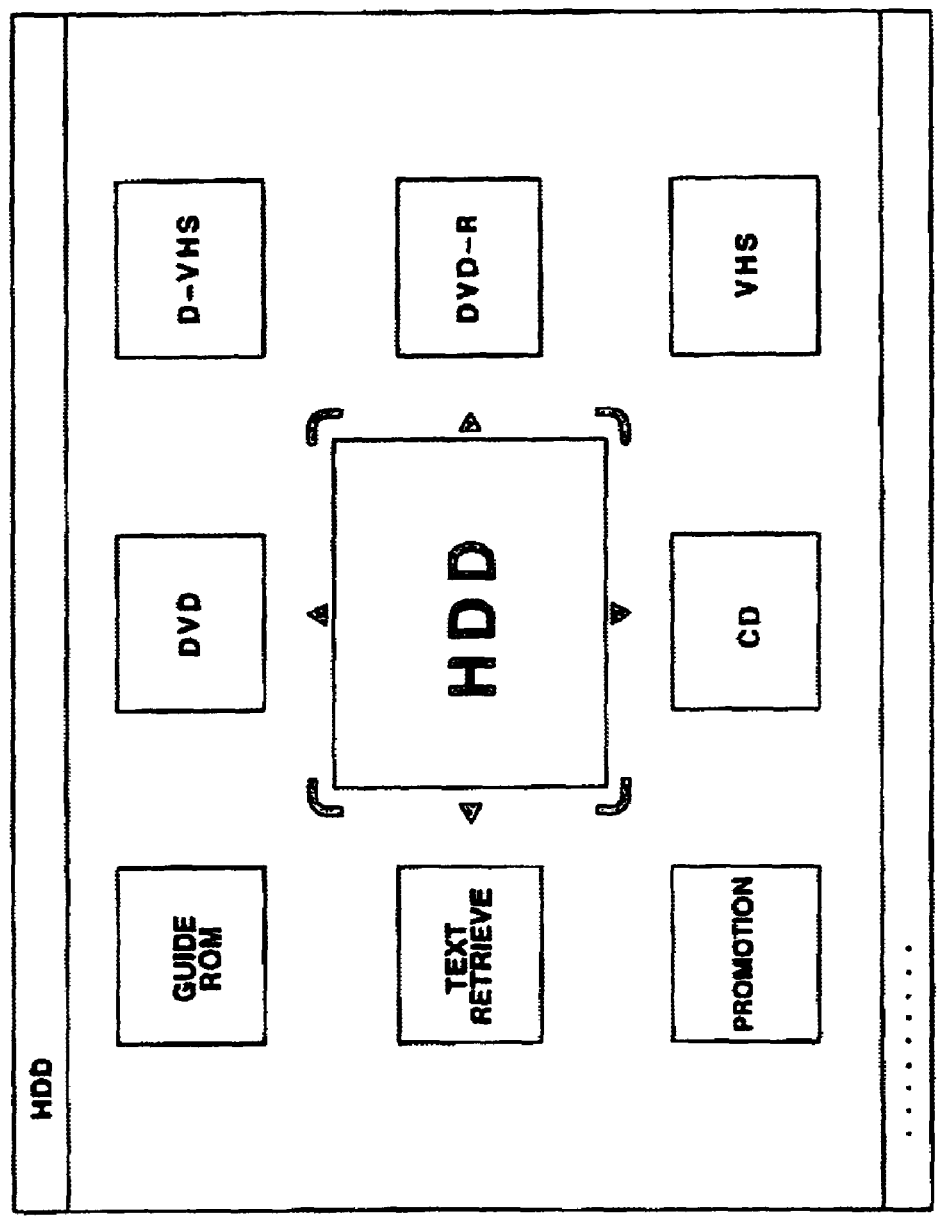
FIG. 19 is a plane view showing the menu screen of media shown in FIG. 18.

FIG. 19 is a plane view showing the menu screen of media. The internal control section 4 displays nine icons on this menu screen. That is, an icon (Guide ROM) for opening a program guide using CD-ROM, an icon (Text Search) for opening a program search based on text search, and an icon (Promotion) for opening a channel of promotion based on digital satellite broadcasting are arranged from the top in the left end. If any of these three icons is selected, the internal control section 4 executes corresponding processing by switching to a display screen different from menu screens based on the layer structure as described above with reference to FIG. 17.

Also, icons for specifying a digital video disk (DVD), a hard disk device (HDD), and a compact disk player (CD) are arranged from the top in the center. From the top side in the right end, icons for specifying D-VHS, DVD-R, and VHS are respectively arranged. The internal control section 4 enlarges and displays the focused icon in the center of the menu screen also in this case. The icons arranged in the center and the right side on the menu screen indicate various media such as a video disk recorder 8 described above and the like, which can be connected to the set-top box 1 through the home network.

The internal control section 4 switches the display to this menu screen of media from the main menu screen, in a manner similar to the case where the display is switched from the main menu screen to the menu screen of recommended channels. That is, the internal control section 4 switches the display with a transit screen inserted. On the transit screen, the menu of media is gradually enlarged such that the display zooms in on this menu of media, and the icon surrounded by the focus mark W in the center is gradually enlarged (cf. FIG. 8).

In contrast, when the user operates the selection operation key 18C with the menu screen of media displayed, the entire menu screen is scrolled with the focus mark W maintained at the center of the screen, and the focus is switched to the icon surrounded by the focus mark W, like the case of the menu of recommended channels (cf. FIG. 9). At this time, the display of the icon which has been enlarged and surrounded by the focus mark W is gradually minified at the sa-me time when the entire screen shifts, and subsequently, the display of the icon newly surrounded by the focus mark W is gradually enlarged.

Figure 20:
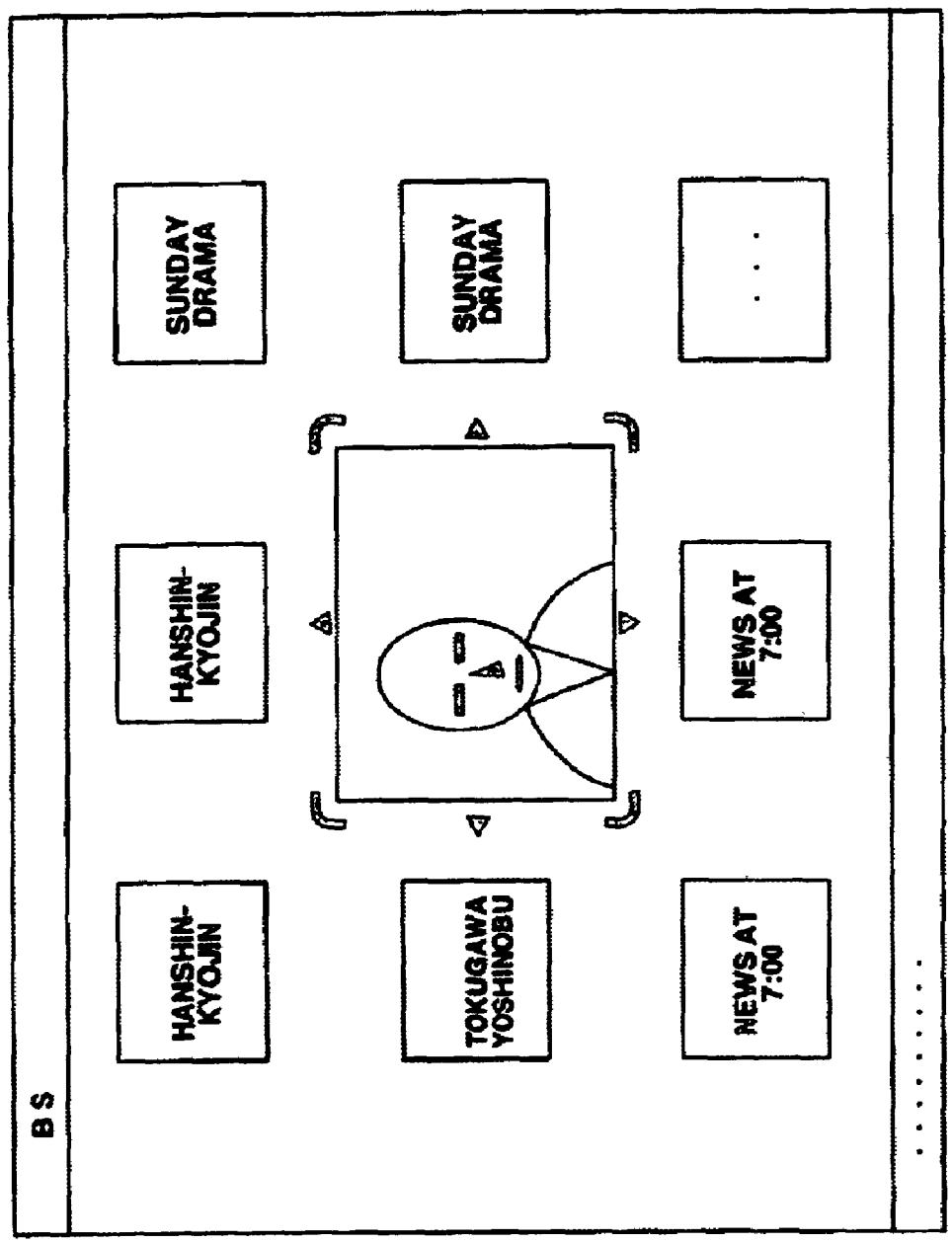
FIG. 20 is a plane view showing a menu screen of program selection of media.

FIG. 20 is a plane view showing a menu screen of program selection in a lower layer corresponding to one icon on the menu screen of media. The internal control section 4 layouts, for example, index images at the start times of respective programs among index images added during recording, to create the menu screen of program selection.

For example, with respect to a program selection menu based on a DVD or the like which is a reproduction-only medium, an index image recorded on the DVD disk is displayed, and if necessary, a beginning part is reproduced to create the menu screen.

At this time, for example, it can be considered that nine or more programs are recorded in the hard disk device. Therefore, the internal control section 4 assigns icons respectively to all the programs that are grouped into the icon of the hard disk device, and creates the entire screen by arranging all these icons.

The internal control section 4 zooms in onto a part of the entire screen to display nine icons, and prepares the menu screen of program selection by displaying the nine icons. At this time, with respect to the icon at the screen center, the program as the contents of this icon is displayed in form of a child screen.

When switching the display from the menu screen of media to the menu screen of program selection, the internal control section 4 switches the display, inserting intermediately a transit screen similar to the transit screen described above with reference to FIGS. 15 and 16. That is, a focused menu is gradually enlarged with the focus mark W kept displayed. When this menu becomes equal to or larger than a predetermined value, the display of this icon is rendered gradually transparent so that icons in a lower layer can be viewed with eyes. Subsequently, the internal control section 4 displays the entire screen based on all the icons and gradually enlarges the entire screen to display the menu screen of program selection. Further, at this time, the icon surrounded by the focus mark W at the center is gradually enlarged, and the display of this icon is switched to display of a child screen when the icon becomes equal to or larger than a predetermined value.

In contrast, when the user operates the selection operation key 18C with the menu screen of program selection displayed, the entire menu screen (which is the entire screen displaying all icons in this case) is scrolled, like in the case of the menu screen of recommended channels (cf. FIG. 9), and the focus is switched to the icon surrounded by the focus mark W. At this time, the display of the child screen which has been enlarged, displayed, and surrounded by the focus mark W is switched to display of an icon and is gradually minified, at the same time when the entire screen shifts. Subsequently, the display of the icon surrounded by the focus mark W is gradually enlarged and switched to display of a child screen.

Also, when the determination operation key 18C is pressed on the menu screen of program selection thus displayed, the internal control section 4 switches the display to a focused program. In this case, on the menu screen of program selection, the child screen focused at the screen center is gradually enlarged and displayed (cf. FIG. 10), and the display of this child screen is finally enlarged over the entire display screen.

In contrast, when the cancellation operation key 18C is operated with the selected program thus displayed, the display screen is gradually minified and switched so as to zoom out onto the original menu screen of program selection, on the contrary to the above explanation. At this time, the internal control section 4 zooms out onto the menu screen such that the icon corresponding to the program which has been displayed is surrounded by the focus mark W at the screen center.

Also, when the user presses the cancellation operation key 18C with the menu screen of program selection displayed, the internal control section 4 minifies gradually the display screen and switches the display so as to zoom out onto the original menu screen of media, on the contrary to the above explanation. At this time, the internal control section 4 zooms out from the entire display until the entire screen based on the icon which has been focused is displayed. Thereafter, the section 4 switches the display to the icon of the corresponding medium and zooms out from the icon of this medium. Also, in this case, the internal control section 4 zooms out onto the menu screen of media such that the icon of the medium which has been selected is surrounded by the focus mark W at the screen center.

Further, when the user presses the cancellation operation key 18C on this menu screen of media, the display screen is gradually minified and is switched so as to zoom out onto the original main menu screen, also on the contrary to the above explanation. Also in this case, the internal control section 4 zooms out onto the main menu screen such that the menu of the medium which has been selected is surrounded by the focus mark W at the screen center.

(1-4) Processing Procedure of Layer Display in Internal Control Section 4

Figure 21:
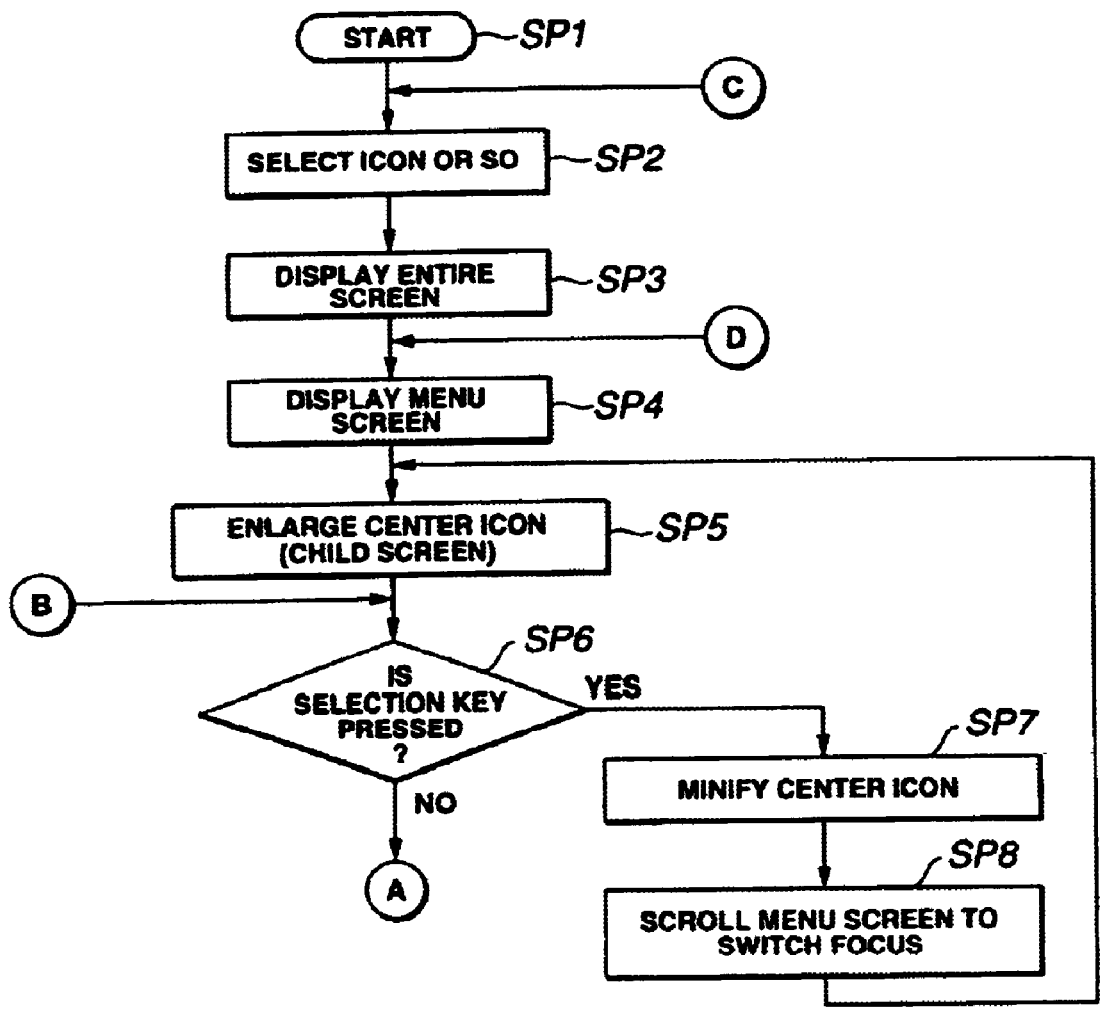
FIG. 21 is a flowchart showing a processing procedure in an internal control section when switching a menu screen.
Figure 22:
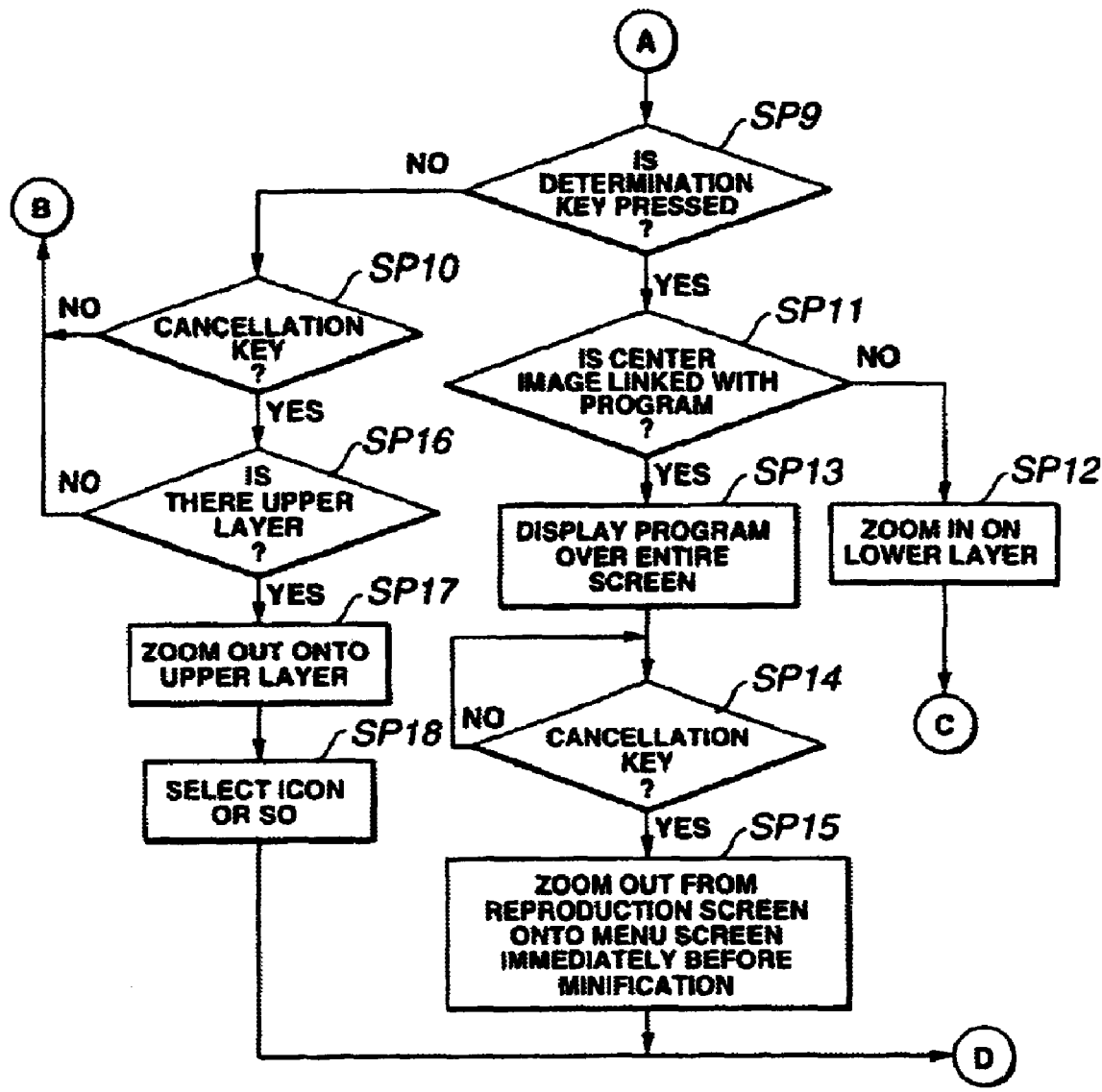
FIG. 22 is a flowchart subsequent to FIG. 21.

FIGS. 21 and 22 are flowcharts showing a processing procedure in the internal control section 4 in case of switching the menu screens and the like according to the zooming processing by enlarging and minifying icons. In this processing procedure, the internal control section 4 goes from a step SP1 to a step SP2 where the section 4 selects corresponding icons from displayed choices and determines the layout of the selected icons.

Subsequently, the internal control section 4 goes to a step SP3 and displays the entire screen based on all corresponding icons. Thereafter, in a subsequent step SP4, an aimed menu screen is displayed. At this time, the internal control section 4 displays the menu screen so as to zoom in from the entire screen. In this manner, for example, if displayed icons are limited and the entire screen is equal to the menu screen like the main menu screen, the internal control section 4 displays directly the menu screen.

Subsequently, the internal control section 4 goes to a step SP5 and enlarges and displays a focused icon at the screen center. In this case, in the menu screen of program selection as the lowermost layer, a child screen is assigned to this enlarged display.

Subsequently, the internal control section 4 goes to a step SP6, and determines whether or not the selection operation key (selection key) 18C is operated or not. If a positive determination result is obtained, the section 4 goes to a step SP7 and minifies the icon at the screen center. Subsequently, the internal control section 4 goes to a step SP8 and scrolls the menu screen to switch the focus. The section 4 subsequently returns to the step SP5 and enlarges and displays the newly focused icon.

Otherwise, if the selection operation key (selection key) 18C is not operated at all, the internal control section 4 goes to the step SP9 from the step SP6 (FIG. 22). The internal control section 4 then determines whether or not the determination operation key (determination key) 18C is pressed. If a negative determination result is obtained, the section 4 goes to the step SP10. The internal control section 4 then determines whether or not the cancellation operation key (cancel key) 18D is operated. If a negative result is obtained, the section 4 returns to the step SP6.

In this manner, the internal control section 4 repeats the processing procedure of the step SP6 to SP9 to SP10 to SP6 while the determination operation key 18C, the cancellation operation key 18D, and the selection operation key 18C are operated.

When the determination operation key 18C is operated while the processing procedure is repeated, a positive determination result is obtained in the step SP9, so the internal control section 4 goes from the step SP9 to the step SP11. The internal control section 4 then determines whether or not the image at the screen center is an image linked to a program, i.e., whether or not the image at the screen center is a child screen for introducing a program.

If the menu screen presently displayed is a menu screen other than the menu screen of program selection, a negative determination result is obtained, so the internal control section 4 goes from the step SP11 to a step SP12. The internal control section 4 further zooms in on the icon at the screen center and thereafter returns to the step SP2. In this manner, the internal control section 4 switches the menu screen to a lower layer sequentially, in response to operation on the determination operation key 18C.

In contrast, in case where the menu screen presently displayed is a menu screen of program selection, a positive determination result is obtained in the step SP11, so the internal control section 4 goes from the step SP11 to the step SP13. In this step, the internal control section 4 switches the entire operation such that the program based on the child screen is displayed over the entire display screen. In this manner, the internal control section 4 displays a program selected by the user, passing through the layers sequentially.

Subsequently, the internal control section 4 goes to the step SP14 and determines whether or not the cancellation operation key 18D is operated. If a negative determination result is obtained, the step SP14 is repeated. In this manner, the internal control section 4 continues displaying a program until the cancellation operation key 18D is operated.

In contrast, when the cancellation operation key 18D is operated while displaying a program, the internal control section 4 goes from the step SP14 to the step SP 15 and switches the display so as to zoom out onto the menu screen of program selection as the menu screen immediately before. Thereafter, the internal control section 4 returns to the step SP4. In this manner, the internal control section 4 can switch the channel being watched and heard as required.

In cases where the internal control section 4 thus returns to the menu screen of program selection and where the menu screen or the like is selected by mistake, the internal control section 4 goes from the step SP10 to the step SP16 by operation of the cancellation operation key 18D. The internal control section 4 then determines whether or not a menu screen in an upper layer exists with respect to the menu screen presently displayed. If the main menu screen is displayed, a negative determination result is obtained, so the internal control section 4 returns from the step SP16 to the step SP6.

In contrast, if there is an upper layer, a positive determination result is obtained in the step SP16, so the internal control section 4 goes from the step SP16 to a step SP17, and switches the display so as to zoom out onto a menu screen in an upper layer. Further, in a subsequent step SP18, the internal control section 4 selects an icon from choices with respect to the menu screen in the upper layer and determines the layout and the like. Then, the section 4 returns to the step SP4.

(1-5) Display of Search Screen

Figure 23:
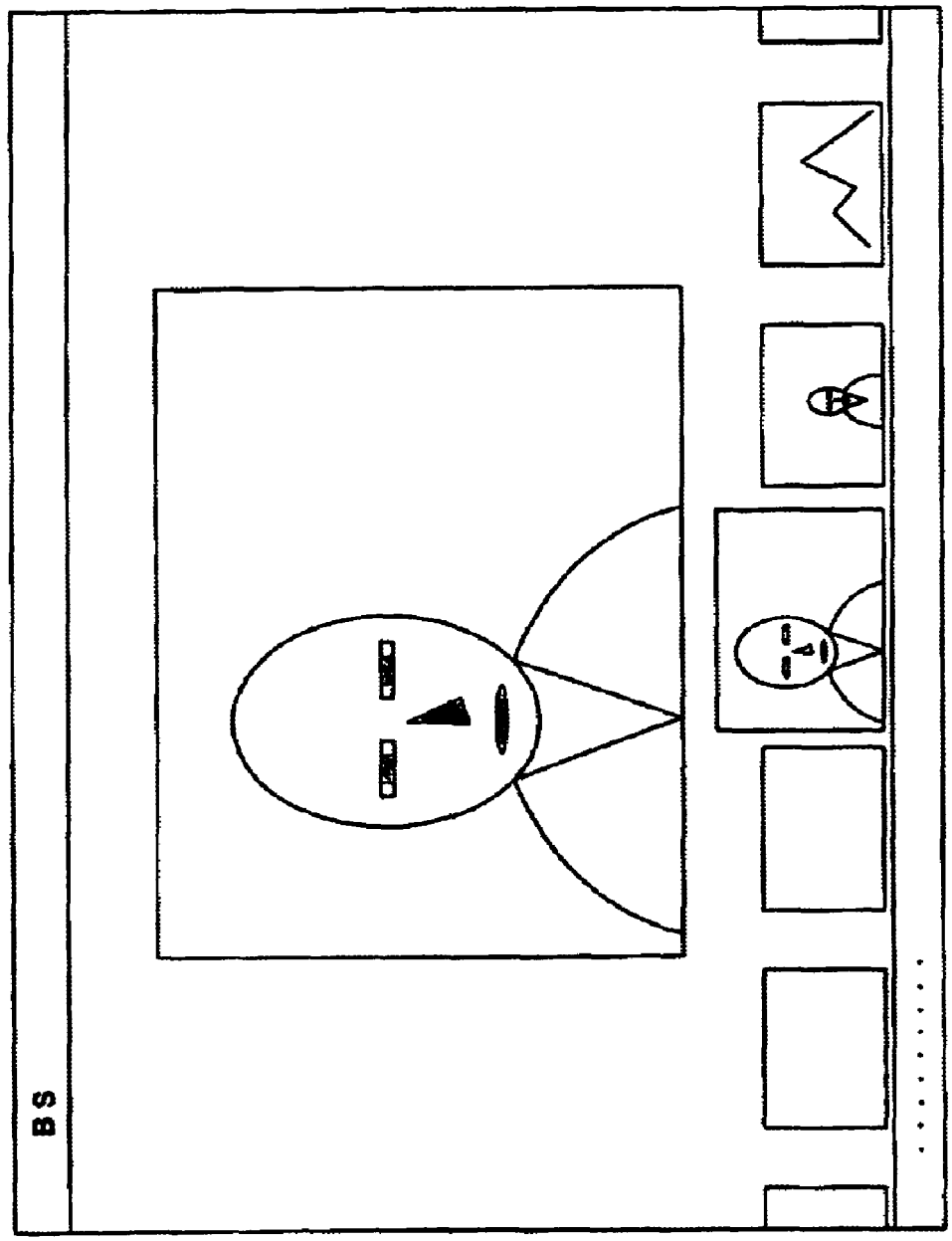
FIG. 23 is a plane view showing a first search screen.

FIG. 23 is a plane view showing a first search screen in case where the shift operation key 18E is operated with a program displayed. The internal control section 4 displays this display screen in case where a medium whose program is displayed is a random-accessible hard disk device or the like.

In this first search screen, the internal control section 4 displays a program which has been displayed over the entire screen, with the program minified. Further, in the lower side of the screen, index images of the program are arranged in the time-series order from the left side. At this time, the internal control section 4 displays an index image (i.e., a focused index image) corresponding to the image presently displayed at the screen center, with the index image enlarged in comparison with other still images and positioned at the center in the lower side.

Further, when the selection operation key 18C is operated with the shift operation key 18E continuously pressed, still images positioned in the lower side are moved to the left and right in response to this operation. At this time, as these image move, the focus is switched to the still image which is to be displayed in the center in the lower side, and the focused index image is enlarged while the index image which has been enlarged is changed into a size equal to the size of other images.

In contrast, when the determination operation key 18C is operated with the shift operation key 18E continuously pressed, the display image at the screen center is switched so as to correspond to the focused index image. In this manner, in the set-top box 1, during the period in which the shift operation key 18E is pressed, the first search screen is displayed so that a desired scene can be selected as if feed forward and rewind were carried out in a video tape recorder. Further, processing corresponding to the feed forward and rewind can be executed at instance.

To execute the processing as described above, the internal control section 4 switches control commands to be issued to the hard disk device or the like if necessary. In this manner, index images necessary for forming this search screen are provided for the graphics display signal preparation section 10.

Figure 24:
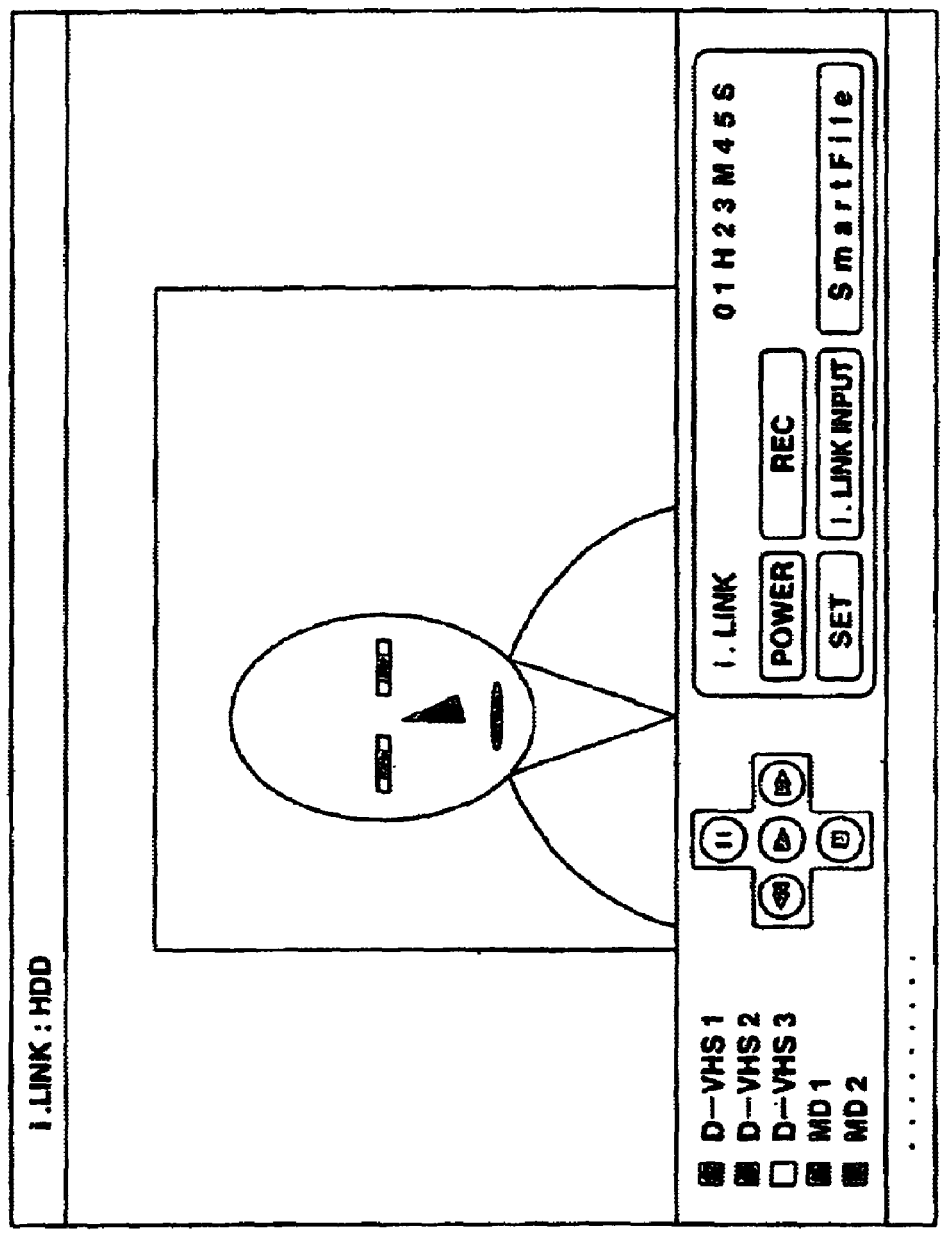
FIG. 24 is a plane view showing the first search screen in case where media are difficult to randomly access.

In this respect, FIG. 24 is a plane view showing a first search screen displayed in case where the medium is a video tape recorder or the like which is difficult to access randomly. In this case, it is difficult to find heads of programs by random access, so the internal control section 4 displays icons like operation keys of a video tape recorder, in place of still images in time series.

Further, when the selection operation key 18C is operated with the shift operation key 18E continuously pressed, the brightness of these icons is switched in response to this operation, so that the icon of the focus can be viewed with eyes. Further, when the determination operation key 18C is pressed with the shift operation key 18E pressed continuously, the internal control section 4 outputs a control command for feed forward, rewind, or the like to a video tape recorder or the like, in correspondence with the focused icon. A reproduced image obtained as a result of this is displayed at the screen center.

In contrast, if the press of the shift operation key 18E is released, the internal control section 4 displays the screen displayed at the screen center, over the entire screen, and returns to the original display screen.

Figure 25:
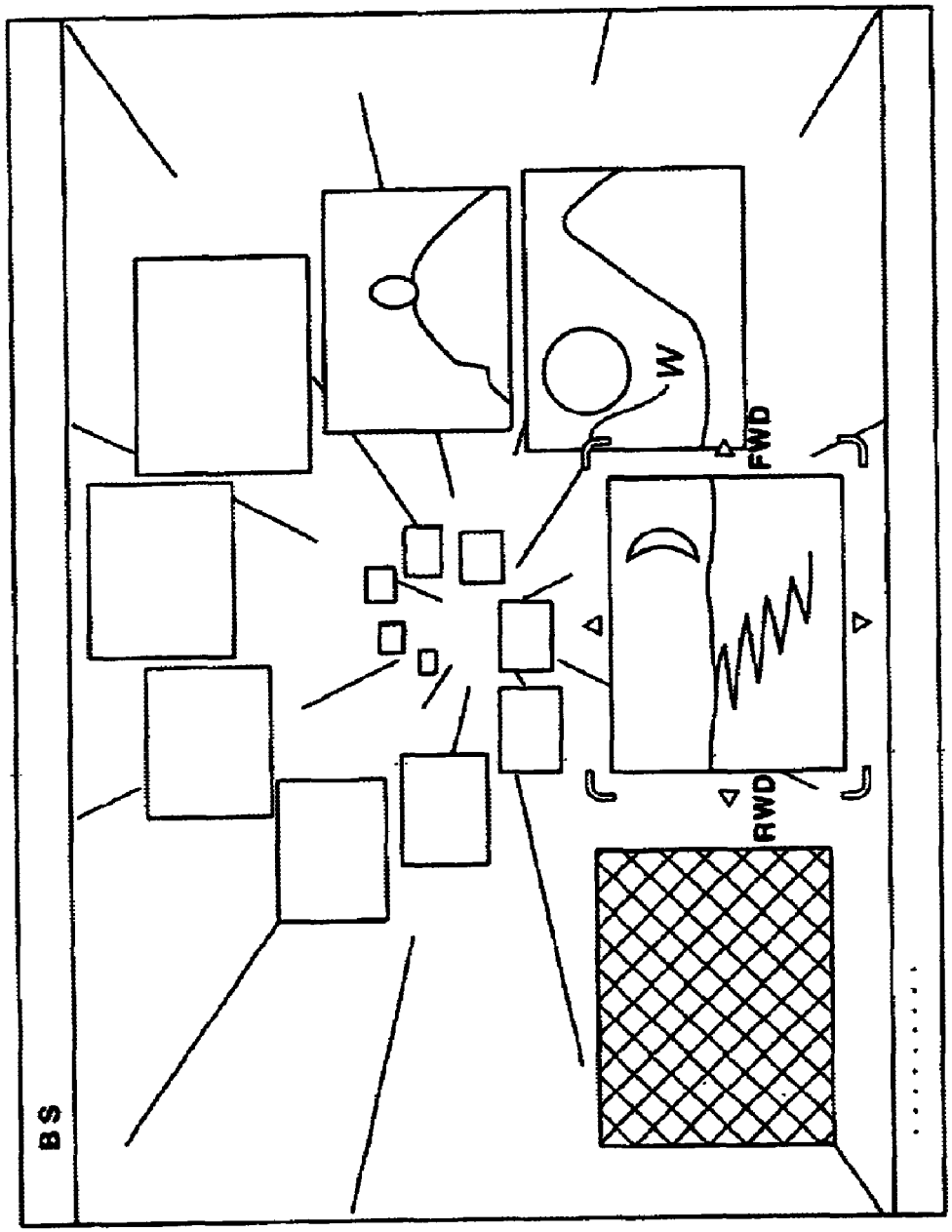
FIG. 25 is a plane view showing a second search screen.

In contrast, FIG. 25 is a plane view showing a second search screen in case where the shift operation key 18E and the determination operation key 18C are simultaneously operated while the menu screen of program selection in a medium is displayed. The internal control section 4 displays this display screen if the medium displayed in a child screen is a medium such as a hard disk device or the like which is randomly accessible.

Then, in the second search screen, the top index image of a program presently focused is displayed at the screen center in the lower side, surrounded by the focus mark W. Further, index images relating to the focused program are displayed and minified sequentially in a direction sequentially along the time axis, spirally toward the center of the display screen, in the anti-clockwise direction from this index image. Further, the display is gradually faded out toward the center of the spiral from the outer circumferential side so that the background is seen through.

In this respect, in the clockwise direction of the focused index image, an index image at an earlier time point than the presently focused index image is displayed in correspondence with the size of the display which sequentially changes along the spiral layout of index images. This index image is also displayed to be faded such that the background can be seen through. In FIG. 25, since the index image presently focused is the head of a program, a meshed dummy index image is displayed in the display area of the index image at an earlier time point than the presently focused index image.

Further, the second search screen is displayed on the background where the index images spirally spread over from the spiral layout. In this manner, in this set-top box 1, using the focused index image as a reference, the flow of the program which changes in accordance with elapse of time can be visually grasped by the layout along the time axis using perspective, so that a desired scene can be selected easily.

Figure 26A:
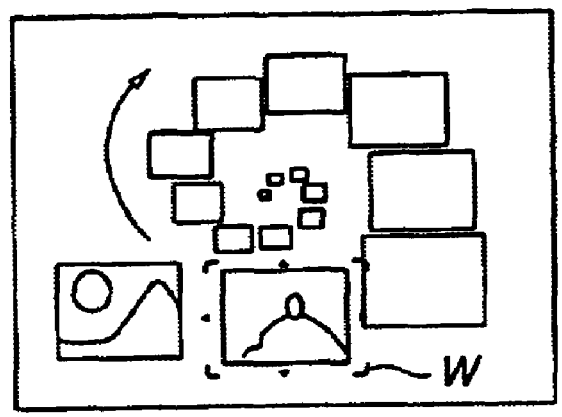
FIGS. 26(A) to 26(C) are plane views used for explaining switching of the focus in the circumferential direction on the second search screen.
Figure 26B:
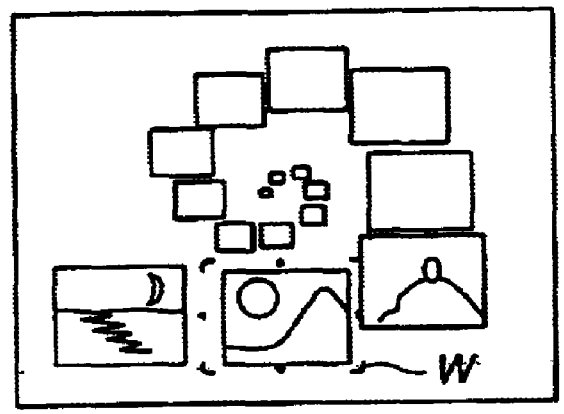

That is, as shown in FIGS. 26, when the selection operation key 18E is operated in the rightward direction, the internal control section 4, as shown in FIG. 26(A) in contrast to FIG. 26(B), with the focus mark W maintained at the present display position, moves the display position of each index image to a display position which is shifted to the past side by one step equivalent to one screen in the clockwise direction. Further, in this movement, each index image is changed to a size corresponding to the position after the movement (or the images may be arranged such that the image is older as the image is closer to the center of the spiral layout and the display position of each index image may be moved in the clockwise direction to a display position which is shifted to the future side by one step equivalent to one screen). Further, the internal control section 4 arranges a subsequent future index image, at the innermost index image layout position where an index image is lost by the movement. Further, the internal control section 4 sets the focus at the index image moved into the focus mark W, and in this manner, the focused index image is switched in the time-axis direction.

Figure 26C:
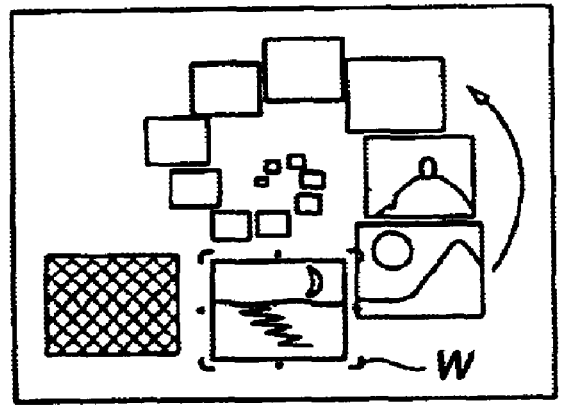

On the contrary to the above, when the selection operation key 18C is operated in the leftward direction, as shown in FIG. 26(C) in contrast to FIG. 26(B), the display position of each index image is moved to a display position in the counterclockwise direction in the future side by one step equivalent to one screen, in response to this operation, with the focus mark W maintained at the present display position. Further, during this movement, each index image is changed to a size corresponding to the position after the movement (or the images may be arranged such that the image is older as the image is closer to the center of the spiral layout and the display position of each index image may be moved in the anticlockwise direction to a display position which is shifted to the future side by one step equivalent to one screen). Also, the internal control section 4 arranges a subsequent index image, at the outermost index image layout position where an index image is lost by the movement. At the same time, the internal control section 4 switches the focus to the index image moved into the focus mark W, and in this manner, the focused index image is switched in the direction opposite to the time-axis.

Figure 27A:
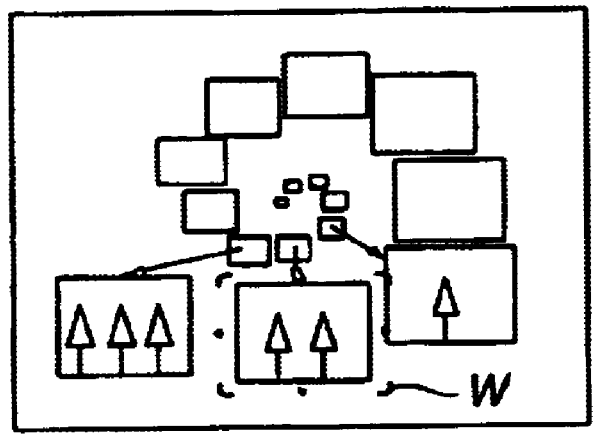
FIGS. 27(A) to 27(C) are plane views used for explaining switching of the focus in the radial direction.
Figure 27B:
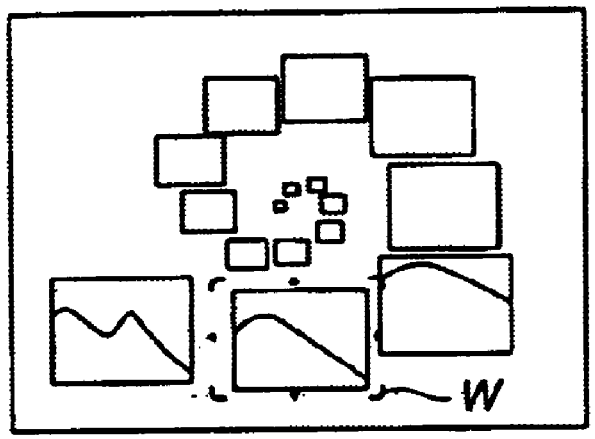

In contrast, when the selection operation key 18C is operated upward, as shown in FIG. 27(A) in contrast to FIG. 27(B), each of the index images arranged in the spiral layout is moved to a display position shifted toward the outer circumferential side of the spiral, in response to this operation, with the focus mark W maintained at the present display position. Further, during this movement, each index image is changed to a size corresponding to the position after the movement. Further, a subsequent index image is sequentially arranged at an index image layout position in the inner circumferential side, where the index image is lost by this movement. At the same time, the internal control section 4 switches the focus to the index image moved into the focus mark W, so the index image is switched in the time-axis direction. In this manner, the internal control section 4 switches the display of the search screen as if the view point was moved to the back side by one turn along the center axis of the spiral layout, with respect to the index images arranged spirally from the front side, and jumps over index images equivalent to one turn of the spiral layout to switch the focused index image in the direction along the time axis.

Figure 27C:
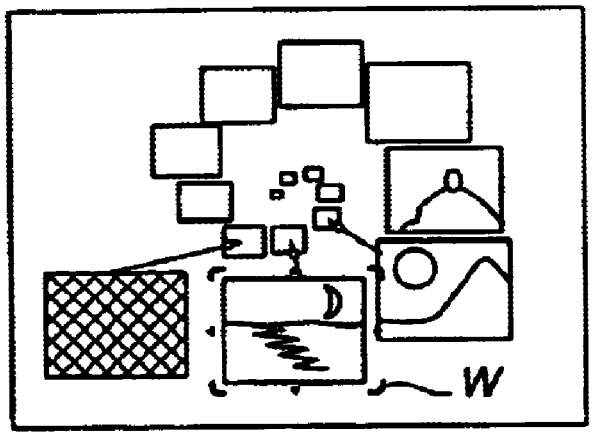

In contrast, when the selection operation key 18C is operated downward, as shown in FIG. 27(C) in contrast to FIG. 27(B), each of the index images arranged in the spiral layout is moved to a display position shifted toward the inner circumferential side of the spiral, in response to this operation, with the focus mark W maintained at the present display position. Further, during this movement, each index image is changed to a size corresponding to the position after the movement. Further, a subsequent index image is sequentially arranged at an index image layout position in the outer circumferential side, where the index image is lost by this movement. At the same time, the internal control section 4 switches the focus to the index image moved into the focus mark W, so the index image is switched in the direction opposite to the time-axis direction. In this manner, the internal control section 4 switches the display of the search screen as if the view point was moved to the front side by one turn along the center axis of the spiral layout, with respect to the index images arranged spirally from the front side, and jumps over index images equivalent to one turn of the spiral layout to switch the focused index image in the direction opposite to the time axis direction.

In contrast, when the determination operation key 18C is pressed, the internal control section 4 displays the focused index image over the entire screen and starts reproducing a recorded video from the index image.

Further, if display of a program is thus started through the second search screen, the internal control section 4 switches the display to the second search screen and displays index images in the same manner as described above, when the determination operation key 18C is operated during display of the program.

In contrast, when the cancellation operation key 18D is operated with the second search screen displayed, the internal control section 4 returns to the original menu screen of program selection.

Figure 28:
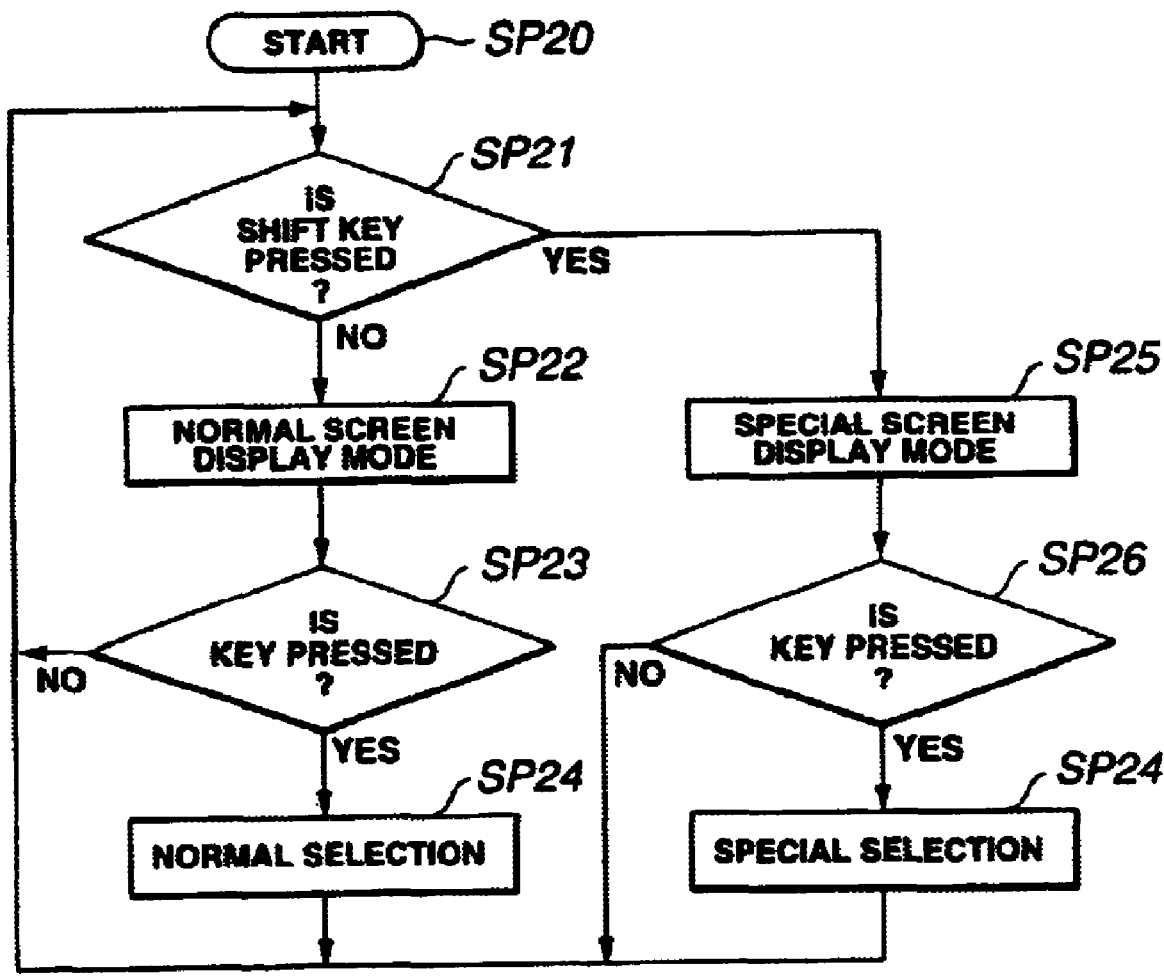
FIG. 28 is a flowchart showing a processing procedure in the internal control section on the display of the first search screen.

(1-6) Processing Procedure in Internal Control Section 4 in Display of Search Screen and Retrieve Screen FIG. 28 is a flowchart showing the processing procedure in the internal control section 4 in the display of the search screen and the display of the retrieve screen, with the operation of the shift operation key 18E used as a standard. When the power is turned on, the internal control section 4 goes from a step SP20 to a step SP21 and determines whether or not the shift operation key 18E (shift key) is pressed. If the shift operation key 18E is not pressed, the internal control section 4 goes to a step SP22 and switches the operation to a normal screen display mode which has been described above with respect to the layer display of menu screens.

Subsequently, the internal control section 4 goes to a step SP23 and determines whether or not another operation key is operated. If no other operation key is operated, the section 4 returns to the step SP21. Otherwise, if any other operation key is operated, the section 4 goes to a step SP24 and switches the display to an upper layer, a lower layer, or the like in response to the operation of the operation key. Thereafter, the internal control section 4 returns to the step SP21.

In contrast, if the shift operation key 18E is pressed, a positive result is obtained in the step SP21, so the internal control section 4 goes to a step SP25 and enters into a special screen display mode. Subsequently, the internal control section 4 goes to a step SP26 and determines whether or not any other operation key is operated. If no other operation key is operated, the section 4 returns to the step SP21. Otherwise, if any other operation key is operated, the section 4 goes to a step SP27 and switches the display screen to a display screen of program guide or a search screen in response to the operation of the operation key. Thereafter, the section 4 returns to the step SP21.

In this manner, the internal control section 4 displays a screen different from a normal case only in the case where the shift operation key 18E is pressed. Accordingly, various operations can be executed with a reduced number of operation keys. In case where a program is displayed, the first search screen is displayed while the shift operation key 18E is pressed in this processing procedure.

Figure 29:
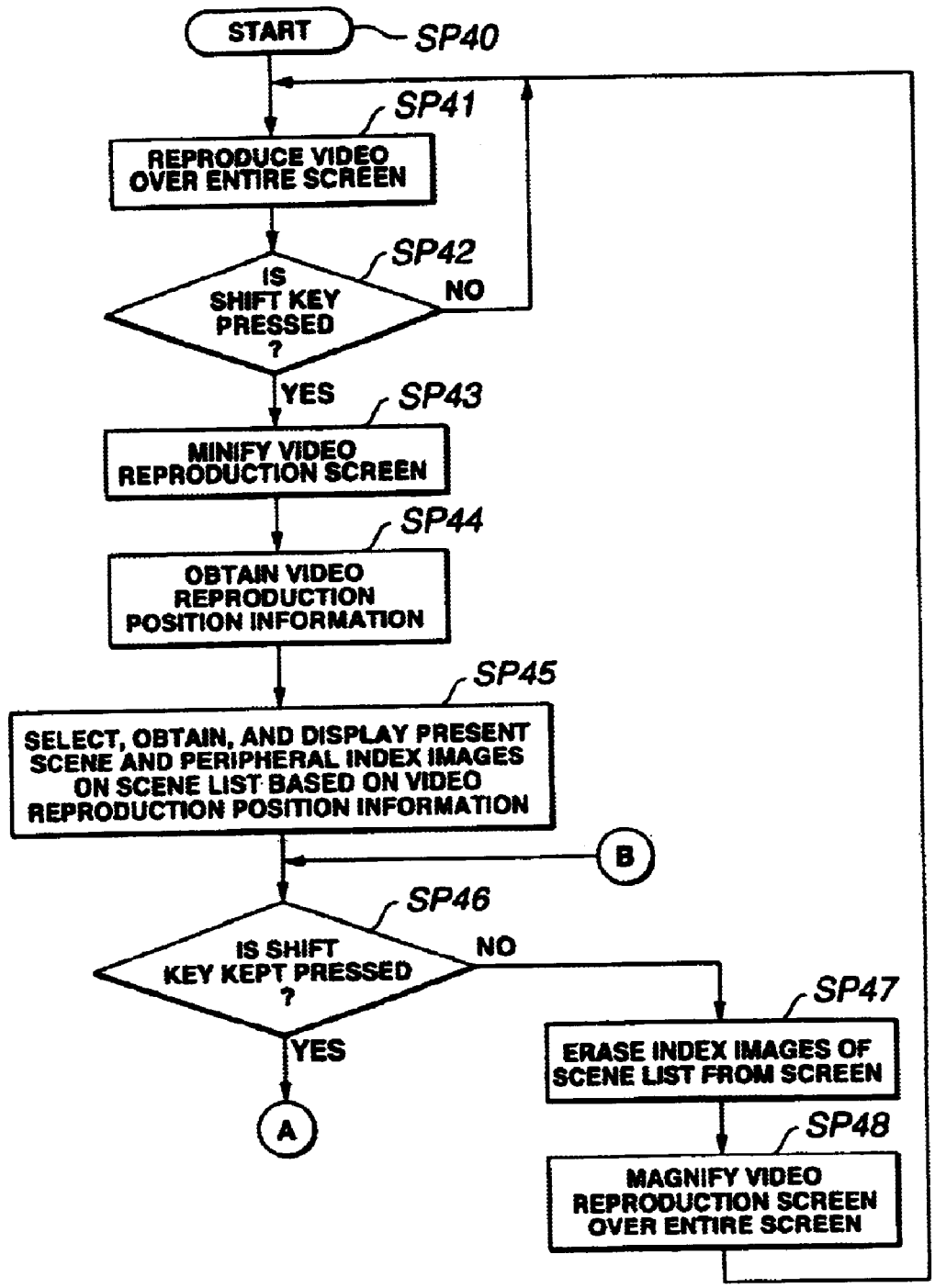
FIG. 29 is a flowchart showing a processing procedure on the display of the first search screen.
Figure 30:
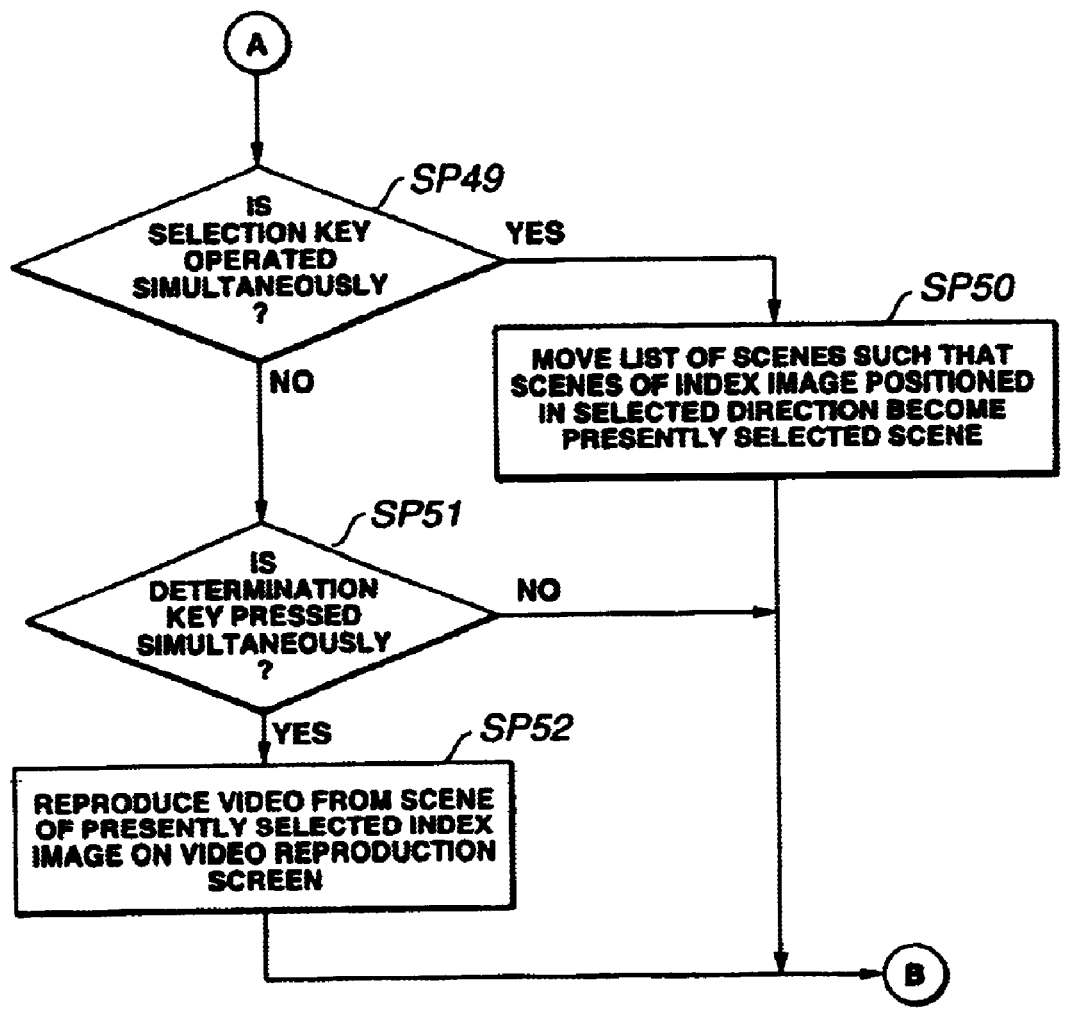
FIG. 30 is a flowchart subsequent to FIG. 29.

FIGS. 29 and 30 are flowcharts showing a processing procedure in the internal control section 4 in the first search screen. The internal control section 4 goes from a step SP40 to a step SP41 and displays a program selected by the user over the entire screen of the monitor device 11 and goes to a step SP42. The internal control section 4 then determines whether or not the shift operation key 18E is operated. If a negative determination result is obtained, the section 4 returns to the step SP41.

In contrast, if a positive determination result is obtained in the step SP42, the internal control section 4 goes to a step SP43 and minifies the display of a video as a program (cf. FIG. 23). Subsequently, the internal control section 4 goes to a step SP44 and obtains position information (e.g., a time code or the like) with respect to the video being reproduced. Thereafter, the section 4 goes to a step SP45 and obtains index images before and after the time information as a standard, from the video disk recorder 8, and displays these index images arranged in the lower side of the minified video.

Subsequently, the internal control section 4 goes to a step SP 46 and determines whether or not the shift operation key 18E is kept continuously pressed. If a negative determination result is then obtained, the section 4 goes to a step SP47 and erases the index images from the display screen. In a subsequent step SP48, the internal control section 4 makes the minified and displayed video recover the original size, and returns to the step SP42.

In this manner, when the shift operation key 18E is pressed, the internal control section 4 displays the first search screen. When the press of the shift operation key 18E is released, the original display screen is displayed.

In contrast, if the shift operation key 18E is kept continuously pressed, the internal control section 4 goes from the step SP46 to a step SP49 (FIG. 30), and determines whether or not the selection operation key 18C is operated in addition to the shift operation key 18E. If a positive determination result is obtained, the internal control section 4 goes to a step SP50 and moves the positions of the index images to switch the focused index image, in response to the operation of the selection operation key 18C. The internal control section 4 then returns to the step SP46.

In contrast, if a negative determination result is obtained in the step SP49, the internal control section 4 goes to a step SP51 and determines whether or not the determination operation key 18C is operated in addition to the shift operation key 18E. If a negative determination result is obtained, the internal control section 4 returns to the step SP46. Otherwise, if a positive determination result is obtained, the internal control section 4 goes to a step. SP52 and switches the display to a corresponding reproduced image, with respect to the scene of the focused index image. Then, the internal control section 4 returns to the step SP46.

In this manner, the internal control section 4 is arranged such that a program can be watched and heard from a desired scene by operating the operation key 18C with the shift operation key 18E pressed.

Figure 31:
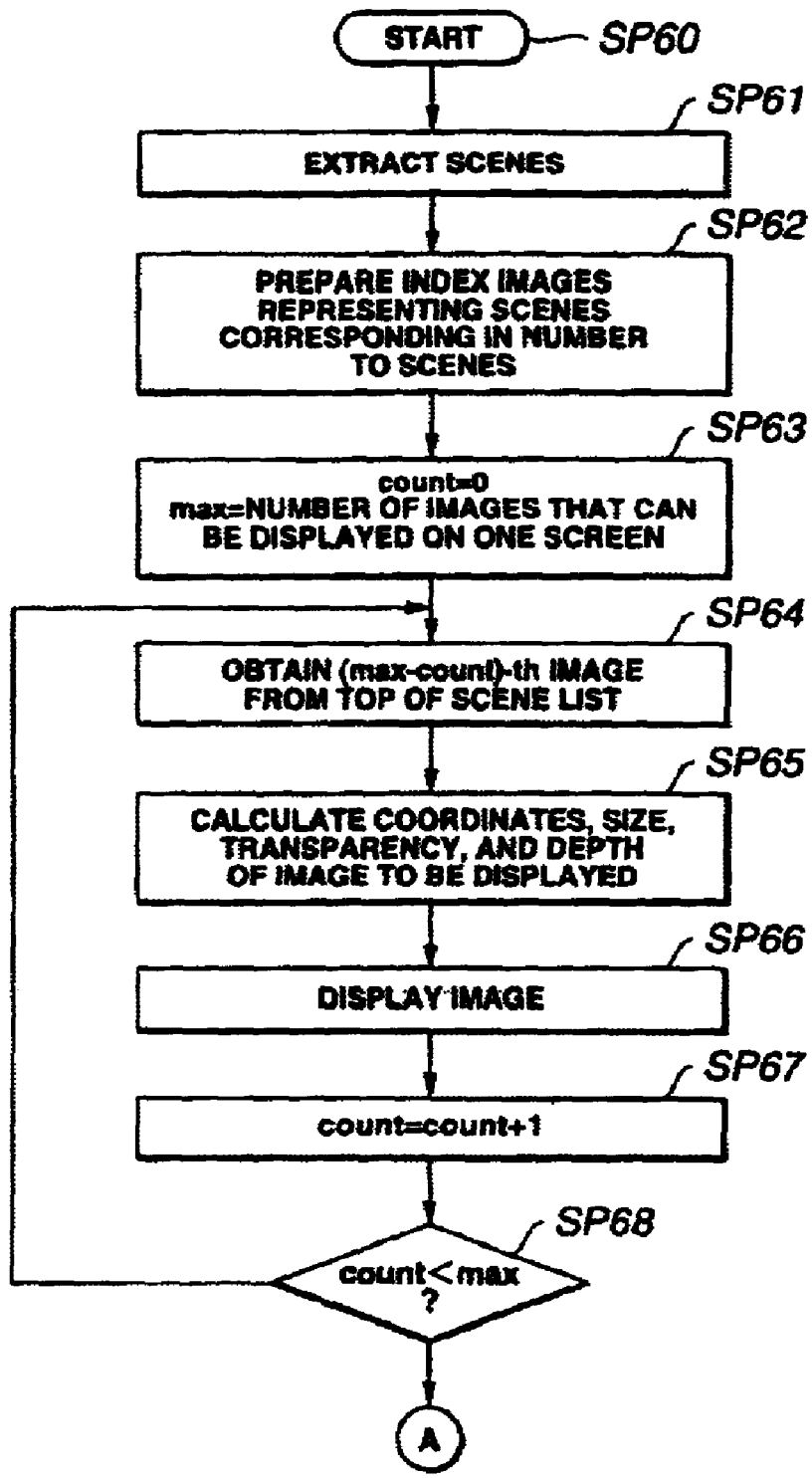
FIG. 31 is a flowchart showing a processing procedure in the internal control section on the display of the second search screen.
Figure 32:
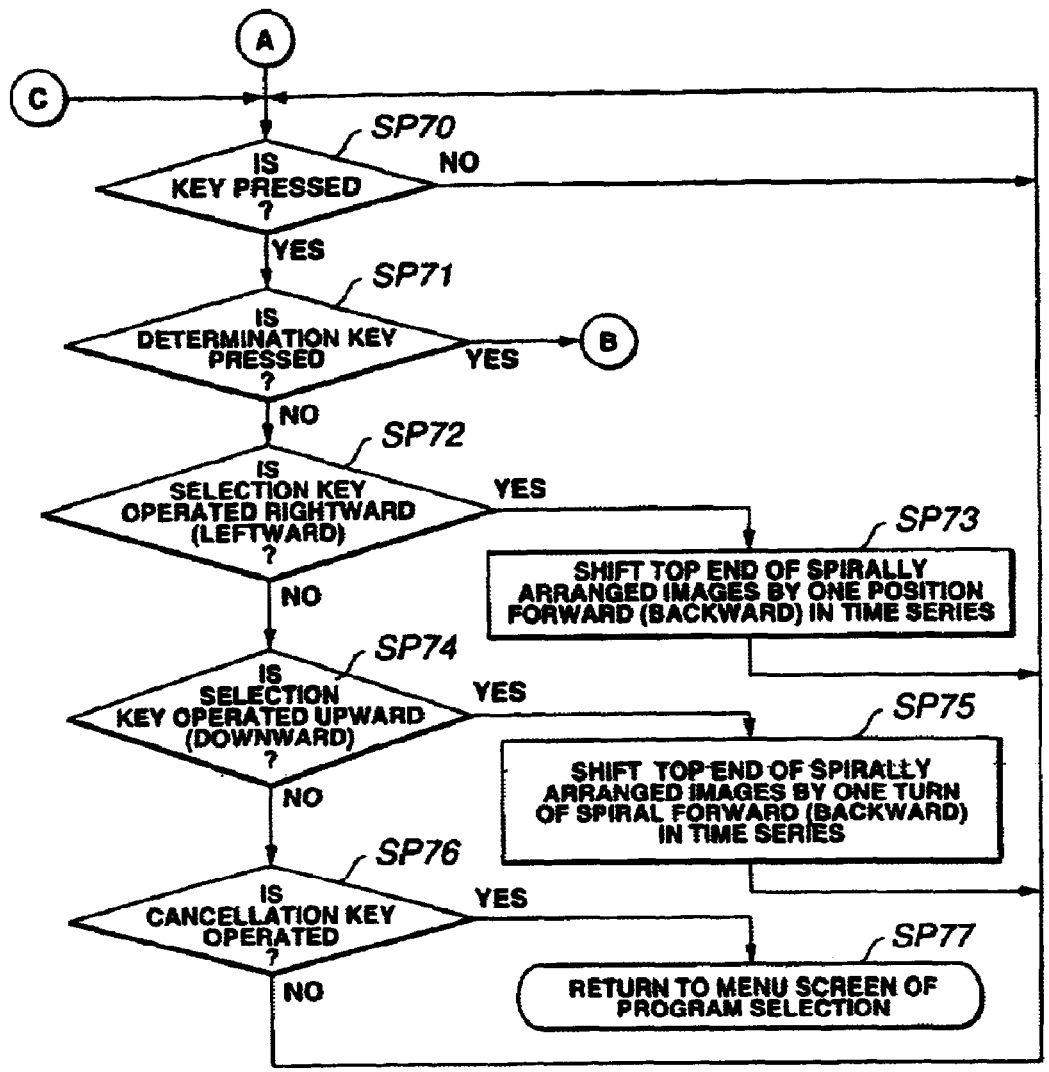
FIG. 32 is a flowchart subsequent to FIG. 31.
Figure 33:
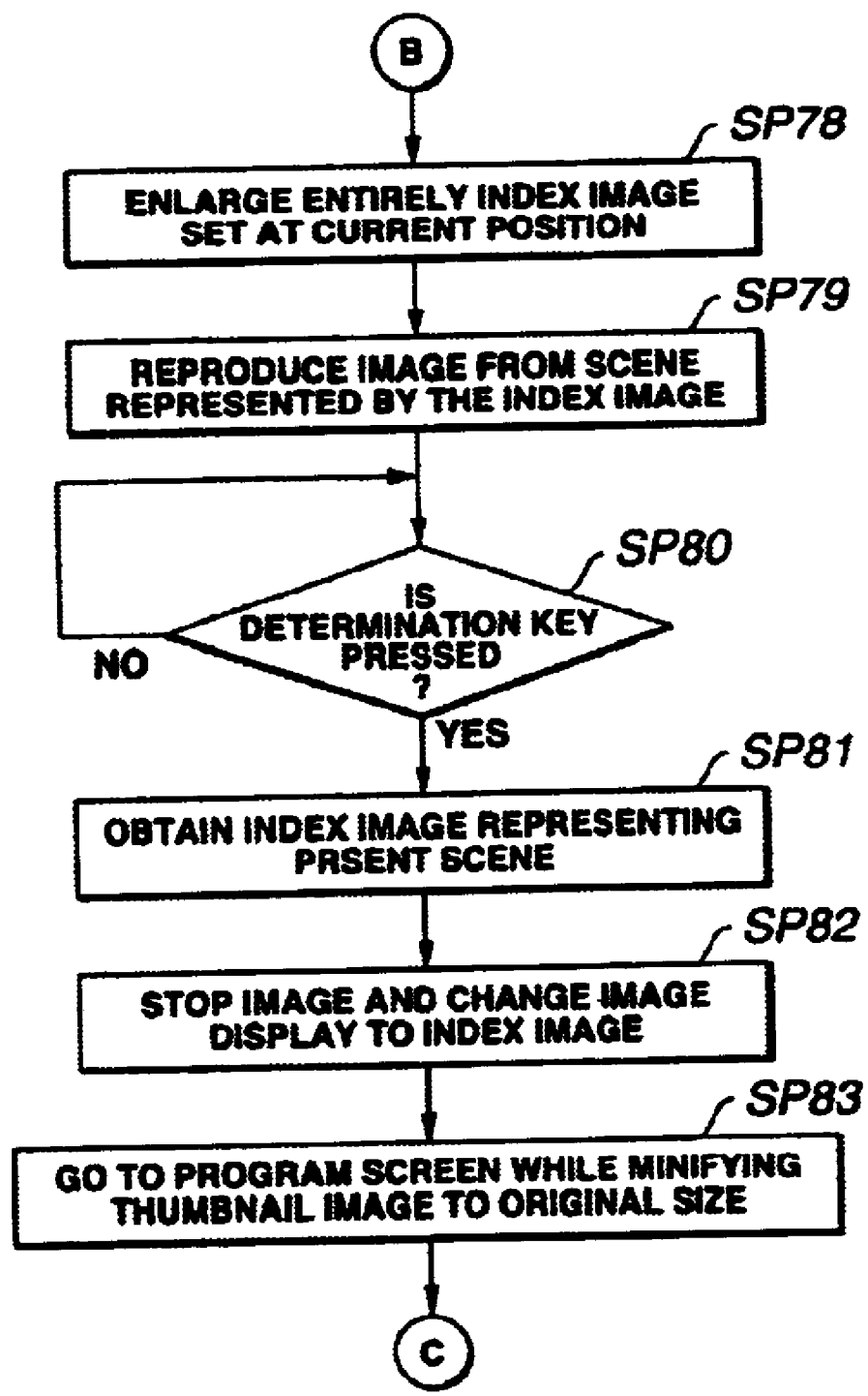
FIG. 33 is a flowchart subsequent to FIG. 32.

FIGS. 31, 32, and 33 are flowcharts showing a processing procedure in the internal control section 4, which relate to the second search screen. In this processing procedure, a processing procedure when recording a program is shown together. That is, the internal control section 4 goes to a step SP61 from a step SP60, and selects candidates of index images while recording image data provided sequentially through digital satellite broadcasting on the video disk recorder 8, for example. Further, in a subsequent step SP62, the internal control section 4 sets an index image for every scene from the selected candidates of index images, and records the index image as a thumbnail image into the medium under recording.

When the determination operation key 18C is operated on the program selection menu of media with the shift operation key 18E pressed after program recording is thus completed, the internal control section 4 goes to a step SP63 and sets a count value (count) for specifying an index image to 0. Also, the number (max) of index images displayed on the screen is set to a maximum value which can be displayed on the second search screen.

Subsequently, the internal control section 4 goes to a step SP64 and obtains an index image expressed by a variable (max)-(count) from the top of the sequence of the focused program, from the video disk recorder 8. Thereafter, the section 4 goes to a step SP65 and calculates the coordinates, size, transparency, and depth of this index image.

In a subsequent step SP66, the internal control section 4 displays the index image obtained in accordance with the calculation result, on the display screen. Thereafter, the internal control section 4 goes to a step SP67 and increases the count value (count) by 1. Subsequently, the internal control section 4 goes to a step SP68 and determines the count value (count) is equal to or smaller than a maximum value (max) which can be displayed on the second search screen. If a positive determination result is obtained, the internal control section 4 goes to the step SP64. In this manner, the internal control section 4 repeats a processing procedure of the steps SP64 to SP65 to SP66 to SP67 to SP68 to SP64 to arrange spirally the index images and thereafter goes to a step SP70 (FIG. 32).

The internal control section 4 determines whether or not any operation key is operated in the step SP70. If a negative determination result is obtained, the step SP70 is repeated. In contrast, if any operation key is operated, a positive determination result is obtained so that the internal control section 4 goes to a step SP71 from the step SP70 and determines whether or not the determination operation key 18C is operated. If a negative determination result is obtained, the internal control section 4 goes to a step SP72 and determines whether or not the selection operation key 18C is operated in the rightward or leftward direction.

If a negative determination result is obtained, the internal control section 4 goes to a step SP73 and moves the spirally arranged index images in the spiral layout direction or a direction opposite thereto, in correspondence with the operation direction of the operation key 18C. Simultaneously, the section 4 changes the sizes of the index images (cf. FIG. 26) and then returns to the step SP70.

In contrast, if a negative determination result is obtained in the step SP72, the internal control section 4 goes to the step SP74 from the step SP72 and determines whether or not the selection operation key 18C is operated in the upward or lower direction.

If a positive determination result is obtained, the internal control section 4 goes to a step SP75 and moves the spirally arranged index images toward the outer or inner circumferential side in correspondence with the operation direction of the operation key 18C and changes the sizes (cf. FIG. 27). The section 4 then returns to the step SP70.

In contrast, if a negative determination result is obtained in the step SP74, the internal control section 4 goers to a step SP76 and determines whether or not the cancellation operation key 17D is operated. If a negative determination result is obtained, the internal control section 4 returns to the step SP70. Otherwise, if a negative determination result is obtained, the section 4 goes to a step SP77 and switches the display screen to a menu screen of program selection (FIG. 20).

In contrast, if the determination operation key 18C is pressed, the internal control section 4 goes to a step SP78 from the step SP71 (FIG. 33). The index image arranged at the current position is enlarged over the entire screen. Subsequently, the internal control section 4 goes to a step SP79 and instructs the video disk recorder 8 to start reproducing a scene specified by the index image, and displays a reproduction result thereof on the monitor device 11. In this manner, the set-top box 1 is arranged such that the flow of time is visually grasped and a desired scene can be easily selected.

Subsequently, the internal control section 4 goes to a step SP80 and determines whether or not the determination operation key 18C is pressed again. If a negative determination result is obtained, the internal control section 4 repeats the step SP80. In contrast, if a positive determination result is obtained, the section 4 goes to a step SP81.

The internal control section 4 then obtains an index image corresponding to the scene presently displayed, from the video disk recorder 8, and stops reproducing a video by the video disk recorder 8 in a subsequent step SP82. Simultaneously, the internal control section 4 switches the display of the video to the index image, and thereafter goes to a step SP83 in which the section 4 gradually minifies the index image and arranges the current position on the second search screen. At this time, the internal control section 4 simultaneously obtains preceding and following index images necessary for the second search screen from the video disk recorder 8, and arranges the index images.

After the second search screen is thus displayed, the internal control section 4 returns to the step SP70 and waits for a subsequent operation. In this manner, the set-top box 1 can rapidly return to the second search screen as required if a desired scene is obtained from the second search screen and is watched and heard.

Figure 34:
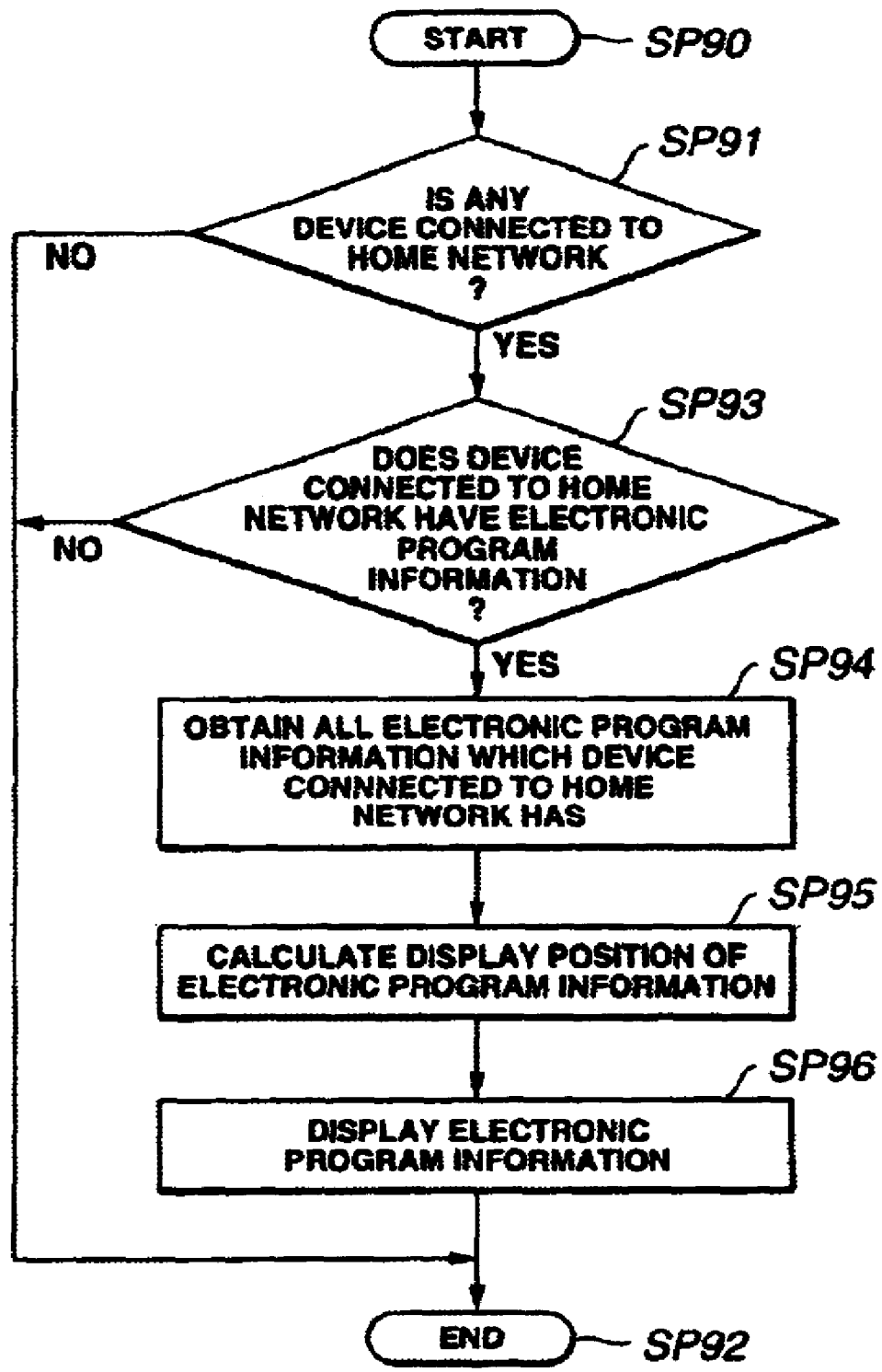
FIG. 34 is a flowchart used for explanation of operation of obtaining of program information.

In case where various programs which can be provided by the set-top box 1 are systemized and managed by the main menu screen and the like, it is necessary to obtain program information which can be provided from the video disk recorder 8 or the like as an external device. Therefore, when the power is turned on or when the power of another device is turned on or by a notification from the video disk recorder 8 whose recording medium is replaced, the internal control section 4 executes a processing procedure shown in FIG. 34 and various program information necessary for systemized management as described above is thereby obtained.

That is, the internal control section 4 goes to a step SP91 from the step SP90 and determines presence or absence of an external device connected to the home network. This determination is carried out by sending a predetermined command to an IEEE1394 bus by broadcasting and by monitoring a response thereto. If an external device is newly added, a bus reset occurs so that presence or absence of an external device can be determined.

If a negative determination result is obtained, the internal control section 4 goes to a step SP92 and completes this processing procedure. In contrast, if a positive determination result is obtained, the section 4 goes to a step SP93. Based on the response to the broadcasting, the internal control section 4 determines whether or not the device connected to the home network has electronic program information by sequentially issuing control commands for devices respectively and by obtaining responses thereto or by attribute information of the devices added to the response to the broadcasting.

If a negative determination result is obtained, the internal control section 4 goes to a step SP92 and completes this processing procedure. In contrast, if a positive determination result is obtained, the section 4 goes to a step SP94. The internal control section 4 issues a control command to the device having electronic program information and obtains all electronic program information.

In accordance with the electronic program information thus obtained, a menu of retrieve is selected by operation through the operation keys described previously or an icon (guide ROM) for opening a program guide using a CD-ROM assigned to the menu screen of a medium or an icon (text retrieve) for opening a menu of program retrieve through text retrieve is selected. The internal control section 4 then goes to a step SP95 and calculates a display position of the electronic program information on a corresponding display screen. In a subsequent step SP96, the internal control section 4 displays text information based on the electronic program information at this calculated position, and thereafter goes to the step SP92 where the section 4 ends this processing procedure.

In addition to this processing, the internal control section 4 starts the communication device 14 for every week to obtain detailed program information from a predetermined server. Program information provided by broadcasting waves is thereby compensated for.

(2) Operation of Embodiments

In the structure described above, in the set-top box 1 (FIG. 1), a broadcasting wave obtained through the antenna 3 is selected by the tuner 2 so that a transport stream is demodulated, when a user selects watching/hearing of program based on digital satellite broadcasting and a digital ground wave. Thus, a desired channel is selected by this transport stream. Further, image data and sound data of this channel are outputted to the monitor device 11 and the speaker 12. In this manner, a program desired by the user is provided.

When the user selects recording of this program, image data and sound data obtained through the video signal processing section 6 and the sound signal processing section 7 are outputted to the video disk recorder 8 through the home network and are recorded by a hard disk device or an optical disk device as the video disk recorder 8.

Also, program information of the program to be recorded is recorded together by electronic program information obtained by the broadcasting wave, detailed program information obtained from a predetermined server, detailed program information obtained from a CD-ROM attached to the video disk recorder 8, and the like.

Also, in case where the program is recorded onto a recording medium such as a hard disk device or the like which can be randomly accessed, the position of a scene change is detected from sequential image data, and a head image of each scene as the image of the scene change is minified as a thumbnail image and is recorded together as an index image.

Also, when the user thus selects watching/hearing of a program recorded on the video disk recorder 8 or a program provided through a recording medium, image data and sound data obtained from the video disk recorder 8 are inputted to a video signal processing section 6 and a sound signal processing section 7 through the home network. The monitor device 11 and the speaker 12 are driven by the output signals from the video signal processing section 6 and the sound signal processing section 7. In this case, a program desired by the user can be provided.

In case where the user thus watches and hears a program based on digital broadcasting or digital ground wave or where a program provided by the video disk recorder 8 is watched and heard, a menu screen is provided such that an aimed program can be watched and heard easily and rapidly by program information of each program in the set-top box 1.

That is, in the set-top box 1 (FIG. 34), when the power is turned on or when the power of another device is turned on or by notification from the video disk recorder 8 whose recording medium is replaced, an external device connected to the home network is identified by the internal control section 4 (in steps SP91 and SP93). Based on this identification, program information added from the external device during recording is obtained, and further, with respect to a program such as a movie or the like provided by a reproduction-only recording medium, program information is obtained from this recording medium.

Further, program information is obtained from electronic program information added to a broadcasting wave, and further, program information with respect to receivable programs and reproducible programs are obtained from program information provided from a special CD-ROM and program information provided from a predetermined server. In the set-top box 1, programs which can be provided are classified into categories such as movie, music, and the like, depending on this program information.

Also, in the set-top box 1, information of programs which the user watched and beard in the past is recorded. Favourite channels of the user are selected from broadcasting channels in accordance with the record, and the selected broadcasting channels are classified into first to ninth virtual channels in the order from the highest selection frequency.

Thus, in accordance with the past history and the program information, programs which can be provided by the set-top box 1 are classified. In the set-top box 1, when the power is turned on, a menu added with classification based on media is displayed as a main menu screen (FIG. 5), and further, a desired program can be selected, following sequentially the layers by operation on the main menu screen.

In this manner, in the set-top box 1, programs as information screens are unitarily managed and a menu screen is displayed. In case where a number of programs can be provided by obtaining programs from a plurality of information sources, information can be selected, mainly based on the contents of information. Accordingly, the user can select a desired program easily, rapidly, and accurately without being conscious about media such as a video tape recorder, an optical disk, and the like. The operationality can be improved accordingly.

That is, for example, if a user watches and hear digital satellite broadcasting or ground wave broadcasting, the menu of recommended channels (Recommended) is selected on the main menu screen and then goes down the layers sequentially (FIG. 6), so a program of a desired broadcasting channel can be watched and heard without being conscious about digital satellite broadcasting, ground wave broadcasting, or channels.

If the user desires to watch and hear a program of music, movie, or the like, the user selects the menu of categories (Categories) on the menu screen and goes down the layers sequentially (FIG. 12). A list menu is then displayed with respect to a desired genre. By selecting an aimed program from the menu, a desired program can be watched and heard by selecting an aimed program from the menu, without being conscious about whether the program is presently being broadcasted or is recorded in the past.

Further, if the user desires to watch and hear software which is available on the market, the menu of media (Media) is selected on the main menu screen and goes down the layers sequentially (FIG. 18). A list menu of programs is then displayed with respect to a desired medium. By selecting an aimed program from this menu, a desired program can be watched and heard like the case of operating the other menus of recommended channels and categories.

When thus going down the layers from the main menu screen, a focus area is formed at the screen center on the main menu screen, and a focus mark W is formed so as to surround this area. Further, in response to an operation of the selection operation key 18C arranged on the remote commander 18, the main menu screen is scrolled and the focus is switched while the focus mark W indicating the focus area is fixed.

In this manner, in case of selecting a desired menu on the main menu screen, a desired menu can be selected without moving diligently the view point to look for a focused menu, and the operationality can be improved accordingly.

Also, in case where any menu is selected on the main menu screen, each menu is gradually enlarged and displayed (FIG. 8) on each of the subsequent menu screens of recommended channels (FIG. 7), categories (FIG. 13), and media (FIG. 19), such that the display zooms in on each of the menus of the recommended channels, categories, and media.

In this manner, in the set-top box 1, a result of operation selected by the user himself or herself is confirmed with eyes so that switching of the menu screen can be confirmed. In case of managing various programs by layering, error operations can be avoided effectively. Also, the user can grasp a relationship between the display screens before and after switching and can observe the switching of the display screens. Therefore, the user can avoid a situation of losing himself or herself, e.g., the user loses which layer or class the display screen currently displayed is in when the screen is switched at an instance. In this manner, the operationality can be improved.

On each menu screen thus switched, a focus area is formed at the screen center, like the case of the main menu screen, and a focus mark W is formed so as to surround this area. Further, nine menus are provided for each menu screen. Among the nine menus, the menu provided in the focus area at the screen center and surrounded by the focus mark W is enlarged and displayed.

In this manner, in case of selecting a desired menu, a focused menu can be rapidly searched so that the operationality can be improved accordingly.

Also, these menus are displayed as icons on the other menus than the menu at the center. The menu focused at the center is displayed as an icon if there are menu screens in lower layers (FIGS. 13 and 19), and the same menu is displayed as a child screen (FIG. 7) which shows the program if there is not a menu screen in the lower layers.

In this manner, in the set-top box 1, whether or not a desired program can be determined by observing this child screen with eyes. Also, in this manner, the desired program can be rapidly and accurately selected.

Also, in this menu screen, in response to an operation of the selection operation key 18C provided for the remote commander 18, each screen is scrolled and the focus is switched, fixing the focus mark W indicating the focus area. In accordance with this scroll, displays of menus which are out of focus are switched to displays of small icons, and a newly focused icon is enlarged and displayed. If there is not a menu screen in lower layers, this icon is switched to a child screen (FIG. 9).

In this manner, in each of the menu screens in the layers right under the main menu screen, a desired menu can be selected easily and steadily without moving the view point diligently in case of selecting a desired menu, so that the operationality can be improved accordingly. Also, a desired menu can be selected by operation unified with (or common to) the main menu, so that the operationality can also be improved accordingly.

Thus, in case of the recommended channels whose menu screen is in the lowermost layer subsequent to the main menu screen, it is possible to watch and hear a desired program, going down the layers sequentially by opening the menu thus selected (FIG. 10).

In contrast, with respect to a category or medium which has a menu screen in a lower layer, the display screen can be switched to a menu screen in the subsequent lower layer by selecting a menu on each menu screen.

Also in this case, in the set-top box 1, the display of the menu is gradually enlarged and the menu screen is switched so as to zoom in on the focused menu, like the case of switching the display to a menu screen in a layer lower than the main menu screen (FIG. 15).

In this manner, the user can confirm the result of operation, which the user herself or himself selects, with eyes and can confirm switching of the menu screen, like the case where the display of the menu screen in layers lower than the main menu is switched. Therefore, even if various programs are managed by layering, operation errors can be effectively avoided so that the operationality can be improved. Also, a desired menu can be selected by operations unified with (or common to) the main menu, so that the operationality can be improved accordingly.

If an icon is enlarged to be greater than a predetermined value when the menu screen is thus switched by zoom-in, this icon is rendered gradually transparent by transparency processing so a subsequent menu screen is displayed. In this manner, switching of the menu screen is perceived so that the menu screen can be switched without a sense of incongruity.

Further, if a large number of menus are assigned to the menu on which the display should zoom in when the menu screen is thus switched, the entire screen where all the icons corresponding to respective menus are arranged is once displayed and the menu screen is switched so as to zoom in on the entire screen (FIGS. 15 and 16).

In this manner, the user can operate a next menu screen, grasping the entire image of a number of programs, for example, with respect to the category of movie. Accordingly, for example, in case where a movie not displayed on the menu screen is selected in a menu in the lower layer of the movie category, a desired menu of movie can be selected without diligently returning to the menu screen in the original layer. Accordingly, a desired program can be selected rapidly and steadily. Further, in the set-top box 1, each menu screen and further the entire screen are scrolled and the focus is switched with the focus area fixed in the center of the screen, even on the menu screen in a lower layer thus displayed. Accordingly, displays of menus out of the focus are switched to display of small icons, so that a newly focused icon is enlarged and displayed. If there is no menu screen in a lower layer, this icon is switched to a child screen (FIG. 9).

In this manner, in case where a desired menu is selected on the menu screen in the lower layer, a desired menu can be selected easily and steadily without moving the view point diligently to seek a focused menu, so that the operationality can be improved accordingly. Also, a desired menu can be selected by operation unified with (or common to) the main menu, so that the operationality can be improved accordingly.

Thus, in the set-top box 1, the menu screen thus selected with respect to categories and media is a menu screen of program selection in the lowermost layer. Therefore, an aimed program can be easily and rapidly watched and heard by selecting and opening a desired menu.

In both of the cases where the display is shifted to a menu screen in a lower layer and where a program is further selected with respect to the menu selected as described above, in the set-top box 1, the display screen can be switched to lower layers and a program can be selected by pressing and operating the selection operation key 18C provided on the remote commander 18, as a determination operation key 18C.

On the contrary to the above, the user can return to menu screen in upper layers by operating the cancellation operation key 18D. In this manner, in case of going up and down layered menu screens, programs can be selected by unified (common) operations, so that operation errors can be prevented accordingly and the operationality can be improved.

Further, in case of returning to a menu screen in an upper layer, the display screen is switched so as to zoom out and the entire screen is displayed if necessary, on the contrary to the case of going down to a lower layer.

In this manner, even in case of returning to upper layer, the user can return to upper layers, grasping the entire image, without confusion, so that a desired program can be selected rapidly and accurately.

When the shift operation key 18E is pressed and the determination operation key 18C is operated on the menu screen of program selection in the lowermost layer with respect to recommended channels and categories (FIGS. 6 and 12), to switch thus menu screens sequentially, the display is switched to a screen of program guide. When the cancellation operation key 18D is operated with the screen of the program guide displayed, the display returns to the original menu screen.

In case of a recommended channel, broadcasting schedules with respect respective virtual channels are displayed sequentially in the order of broadcasting times, in different colors distinguished between categories, on the screen of the program guide. In this manner, the programs on the broadcasting schedule can be confirmed, and processing for setting timer recording or the like can be executed if necessary. In contrast, in case of categories, a broadcasting schedule and programs which can be watched and heard by various media are displayed as a list, with respect to a focused category, so that a desired program can be watched and heard based on the title or the like.

In this manner, in case where a program is selected by operation different from normal operation for program selection in which a program is selected following layers, a desired program can be selected by operation similar to the case of following layers and using additionally the shift operation key 18E. Accordingly, the operation is unified more so that the operationality is improved.

In contrast, on the program selection menu of media, the display is switched to the second search screen (FIG. 25) when the shift operation key 18E and the determination operation key 18C are operated (FIG. 18).

On the second search screen, with respect to a focused program, index images respectively set for scenes during recording are sequentially enlarged from the inner circumferential side and are arranged and displayed spirally. In this manner, the user can visually grasp a before-after relationship between the index images by perspective of the sequentially enlarged images, so the total elapse of time can be visually grasped from the spiral layout. Hence, the flow of the program and each scene can be easily understood, so that a head of a predetermined scene can be found easily and rapidly. Accordingly, the operationality can be improved. Also, the enlarged image are displayed spirally from the inner circumferential side in the time-series order, an image in the future is not overlapped on a image close to the present time.

Also, on the second search screen, index images closer to the present time which should be discussed in more details are displayed in relatively larger sizes. On the contrary, index images far from the present time which should be less discussed are displayed in smaller sizes. In this manner, images which the user desires to watch and hear are displayed specifically so that the display screen can be effectively used.

At this time, the display becomes gradually faded out as the index images are positioned closer to the center of the spiral, so that the background can be seen through. In this manner, the display obtains depth, so that elapse of time can be easily grasped.

Also, at this time, those index images are arranged on the background spreading radially from the center of the spiral layout, so that perspective is added also by the background. Elapse of time can be easily grasped by the perspective.

In case of thus searching a head of a desired scene by the index images, the index images are moved in the circumferential direction with the focus area fixed, in response to operation of the selection operation key 18C in the leftward and rightward directions, and the sizes of the index images are changed to sizes corresponding to the positions after the movement (FIG. 26). In this manner, the index images can be switched so as to visually follow the time axis, and the operationality can be improved accordingly. Also, at this time, since the focus area is fixed, the movement of the view point is prevented so that the focused index image can be found easily.

Also, in response to operation of the selection operation key 18C in the upward and downward directions, the index images are moved in the directions to the inter and outer circumferential sides with the focus fixed, and the sizes of the index images are changed to sizes corresponding to the positions after the movement (FIG. 27). In this manner, the index images can be switched so as to jump greatly along the time axis, with one turn of the spiral layout taken as a unit, so the jump in the time-axis direction can be grasped visually. Accordingly, the operationality can be improved. Also, at this time, since the focus area is fixed, the view point is prevented from being moved so that a focused index image can be easily found.

When the index images are moved to switch the focus, the index images are set such the index images closer to the inner circumferential side are displayed to be gradually faded, and the index image positioned in the front side in the time axis direction is also displayed to be faded. Therefore, for example, in case of switching the focus in the direction along the time-axis, the index images are displayed as if the index images floated up and came close from the center of the spiral. On the contrary, in case of switching the focus in the direction to the time-axis direction, the display is switched such that an index image which has not observed before comes into the view field.

In this manner, on the second search screen, the display is switched as if the view point was moved between the index images arranged three-dimensionally with the time-axis taken as a standard. Accordingly, the operationality can be improved much more.

After an index is thus selected, a desired program can be reproduced from the scene with the focused index image as the top of the scene, by operating the determination operation key 18C, like the case of going to a menu in a lower layer (FIG. 18). On the contrary, it is possible to return to the original program selection menu by operating the cancellation operation key 18D, like the case of returning to a menu screen in an upper layer. In this manner, a head of a desired program can be found by operation unified with (or common to) other menu screens.

In contrast, when the shift operation key 18E is pressed in case of the screen of program display based on media, the first menu screen is displayed only while the shift operation key 18E is pressed (FIG. 18).

In the first menu screen (FIG. 23), if a medium can be randomly accessed, the screen which has been displayed is minified and displayed, and index images are sequentially arranged in a lateral direction in the lower side of the screen. Further, the focus area is set to the index image at the center, and this focused index image is enlarged to be larger than the other index images.

Also, on this first menu screen, in response to operation of the selection operation key 18C, the layout of the index images is scrolled with the focus area fixed, so that the focused index image is switched. In this manner, the user can easily find a focused index image. Also, after an index image is thus selected, the enlarged image can be switched to a scene based on this index image, by pressing the determination operation key 18C. After thus selecting a desired scene, the user can return to the original program display screen and watch and hear the program, by releasing the press of the shift operation key 18E.

In this manner, while watching and hearing a program, it is possible to watch the program, jumping over scenes as required. Accordingly, the operationality can be improved.

At this time, in the set-top box 1, the first search screen is displayed only while the shift operation key 18E is operated. Accordingly, increase of the number of operation keys on the remote commander 18 (FIG. 3) is prevented, so that it is possible to provide a menu for information selection like the first search screen, which is different from the other screens. Accordingly, in case of providing a larger amount of information, the operationality of an information providing apparatus of this kind can be improved.

Also, the shift operation key 18E which is thus operated is structured such that this key can be operated by a forefinger, gripping the remote commander 18. In contrast, the determination operation/selection operation key 18C is structured such that these keys can be operated by a thumb finger, gripping the remote commander 18 likewise. Therefore, the remote commander 18 can be operated by one hand and a head of a desired scene can be found easily.

At this time, since the shift operation key 18E is arranged separately from the other operation keys 18A, 18B, 18C, and 18D, the user can operate a search screen as a display screen of information selection which is different from the other screens can be operated, distinguished from a menu screen as another information selection screen. Accordingly, operation errors can be prevented in comparison with a case where the operation key for selecting this search screen is arranged without distinguishing this key from the other operation keys, so that the operationality can be improved accordingly.

With respect to the operation key 18C which receives an operation with the shift operation key 18E operated, a determination function is assigned like the menu screen as another information selection screen. Accordingly, a head of a desired scene can be found by operation unified with (or common to) other menu screens.

In contrast, if the operation for selecting the first menu screen is carried out with respect to a medium such as a video tape which is difficult to randomly access, an icon which look like an operation key of a video tape recorder is displayed in place of an index image, and a head of a scene can be found by operating this icon. Also, it is possible to return to the original screen by releasing the press of the shift operation key 18E.

Also, in this case, a head of a desired scene can be found by operation unified with selection on the other menu screens, operation of determination, and operation on the first menu screen or the like. Accordingly, the operationality can be improved.

(3) Advantages of Embodiments

According to the structure as described above, in case of displaying a program from a medium, the display screen is switched to the first search screen only while the shift operation key 18E is operated. Therefore, the number of operation keys can be prevented from being increased even in case of selecting a desired scene through the first search screen. Accordingly, in case of providing an information selection means based on the first search screen, the number of operation keys on the remote commander can be prevented so that the operationality can be improved.

Also, at this time, this shift operation key is arranged separately from the other operation keys, so that the user is allowed to operate the search screen as a display screen for information selection, distinguished from the other screens. Accordingly, operation errors can be prevented more in comparison with a case of simply arranging the operation key for selecting this search screen without distinguishing this key from the other operation keys. Accordingly, the operationality can be improved.

Also, this shift operation key is formed into a trigger-like shape and is arranged such that this key can be operated together with other operation keys, with the remote commander gripped by one hand. Accordingly, the operationality can be improved.

Also, since operation keys which receive an operation with the shift operation key operated are respectively assigned with functions, the operation is systemized accordingly so that operation errors can be prevented.

(4) Other Embodiments

In the embodiment described above, description has been made of the case where the first search screen is displayed while the shift operation key is operated. However, the present invention is not limited hitherto. For example, the second search screen, the program guide, and the like may be displayed only while the shift operation key is operated.

Figure 35:
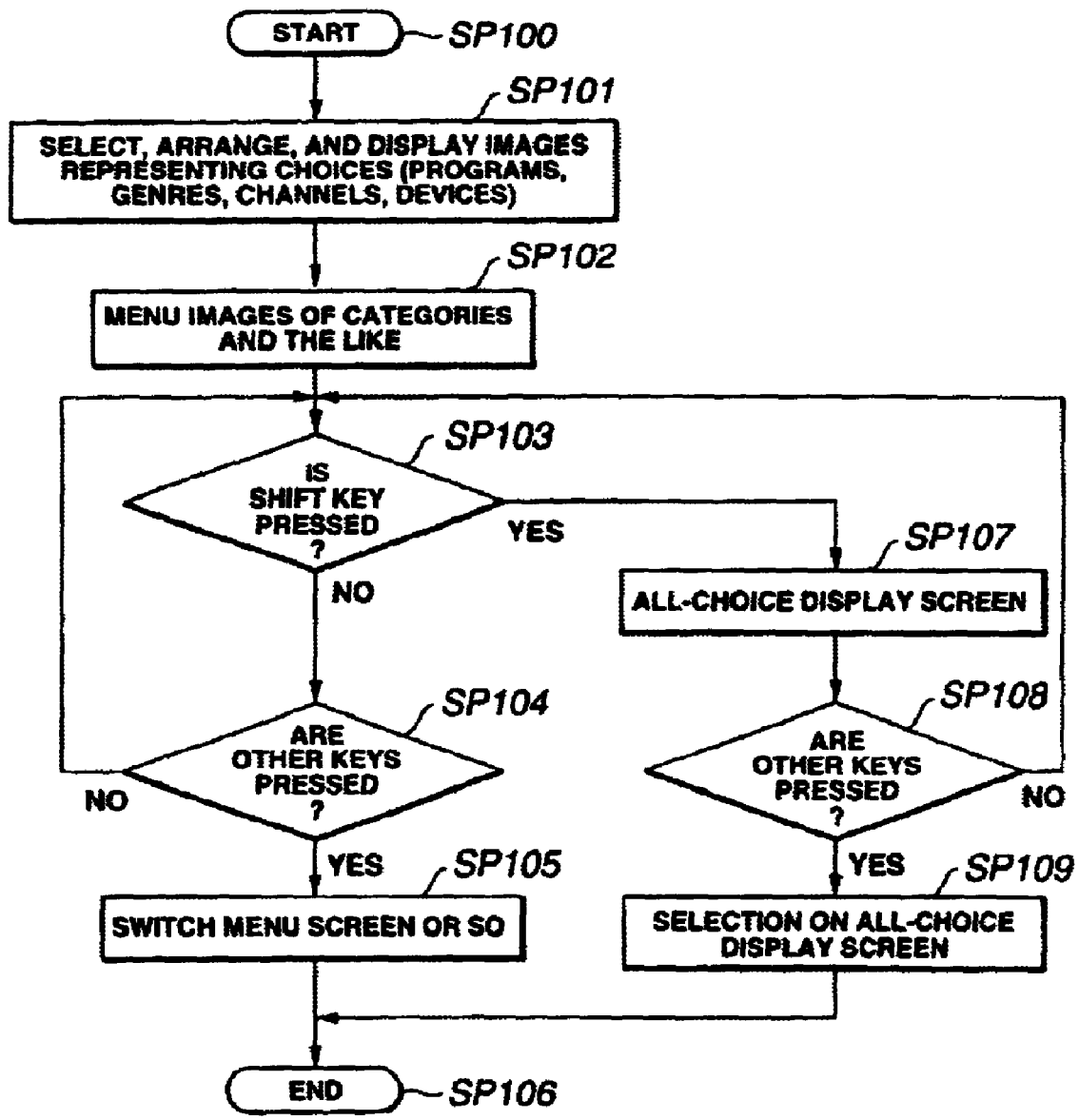
FIG. 35 is a flowchart showing a processing procedure in the internal control section, according to another embodiment.

Also, in this case, it may be arranged such that the entire screen which displays all the selectable icons is displayed only while the shift operation key is operated, for example. In this case, for example, the entire screen can be displayed temporarily by executing a processing procedure as shown in FIG. 35.

That is, in this case, the internal control section 4 goes to a step SP101 from a step SP100 and calculates positions of icons to be displayed. Thereafter, the section 4 goes to the step SP102 and displays the menu screen of categories and the like.

Subsequently, the internal control section 4 goes to a step SP103 and determines whether or not the shift operation key 18E is operated. If a negative determination result is obtained, the section 4 then goes to a SP104 and determines whether or not another operation key is operated. If a negative determination result is obtained in the step SP103, the internal control section 4 returns to the step SP103. Otherwise, if a positive determination result is obtained in the step SP105, the internal control section 4 goes to a step SP105 and executes, for example, corresponding processing of switching of the menu screen or the like described previously. Thereafter, the section 4 goes to a step SP106 and ends this processing procedure.

In contrast, if the shift operation key 18E is operated, the internal control section 4 goes to a step SP107 and displays the entire screen where all choices that can be selected are displayed. Subsequently, the internal control section 4 goes to a step SP108 and determines whether or not another operation key is operated. If a negative determination result is obtained, the section 4 returns to the step SP103. Otherwise, if a positive determination result is obtained, the internal control section 4 goes to a step SP109 and scrolls, for example, the entire screen to switch the focus, in response to operation of the operation key. After opening the focused icon, the internal control section 4 goes to a step SP106 and ends this processing procedure.

If the entire screen is thus displayed temporarily, choices arranged on the same layer can be conformed and selected if necessary, so that a desired program can be selected easily and rapidly.

Although description has been made of a case where information as various programs is provided by applying the present invention to a set-top box, the present invention is not limited hitherto. For example, the present invention may be applied to an information providing apparatus and an information providing method, such as an editing apparatus or the like which provides various information like still images and the like with index images used as references.

INDUSTRIAL APPLICABILITY

As described above, according to the present invention, the display screen is switched to a predetermined display screen only while a first operation key is operated, and processing on this predetermined display screen is received by operation of another operation key. In this manner, the number of operation keys of a remote control device is prevented is prevented from being increased even in case where a large number of programs are provided by various selection methods. Accordingly, the operationality can be improved.

What is claimed is:

1. An information providing apparatus for inputting a remote control signal outputted from a wireless remote control device and switching a display screen in response to the remote control signal to provide various information by selection on a predetermined menu screen, the apparatus comprising:

first determination means for determining whether or not a first operation key is operated on the remote control device to designate a state of the first operation key as operated or not operated;

screen switching means for switching the display screen from a first display screen to a second display screen if the first determination means determines that the first operation key is operated, the screen switching means operating to display the second display screen while the first operation key is operated; and second determination means for determining whether or not the second operation key is operated substantially simultaneously with the operation of the first operation key, wherein if the second determination means determines that the second operation key is operated substantially simultaneously with the operation of the first operation key, processing based on operation of the second operation key is received and displayed on the second display screen, wherein the screen switching means switches the display screen from the second display screen back to the first display screen, if the first determination means subsequently determines that the state of the first operation key changed from not operated to operated, and wherein said information is a series of video information based on a video signal, and the second display screen is a screen on which index images, for guiding scenes of said series of video information based on a video signal, are an arranged in time series.

2. An apparatus according to claim 1, further comprising:

layer screen display means for displaying at least a screen in a first layer and a screen in a second layer lower than the first layer; and layer switching means for switching the screen in the first layer and the screen in the second layer each other, based on a control signal from the remote control device, characterized in that the first display screen is the screen in the second layer, and the display screen is switched from the screen in the second layer to the second display screen if the first determination means determines that the first operation key is operated, and when the display screen is the screen in the first layer, the display screen is switched from the screen in the first layer to a third display screen if the first determination means determines that the first operation key is operated.

3. An apparatus according to claim 1, characterized in that the remote control device includes a grip part which can be gripped by one hand, first operation means provided at a position where the first operation means can be operated by a thumb finger when the grip part is gripped by one hand, and second operation means provided at a position where the second operation means can be operated by a forefinger when the grip part is gripped by one hand, and the first operation key is the first operation means and the second operation means is the second operation key.

4. An information providing method for inputting a remote control signal outputted from a wireless remote control device and for switching a display screen in response to the remote control signal to provide various information by selection on a predetermined menu screen, the method comprising:

a first determination step of determining whether or not a first operation key is operated on the remote control device to designate a state of the first operation key as operated or not operated;

a screen switching step of switching the display screen from a first display screen to a second display screen if it is determined in the first determination step that the first operation key is operated, the screen switching means operating to display the second display screen while the first operation key is operated; and a second determination step of determining whether or not the second operation key is operated substantially simultaneously with the operation of the first operation key, wherein if it is determined in the second determination step that the second operation key is operated substantially simultaneously with the operation of the first operation key, processing based on operation of the second operation key is received and displayed on the second display screen, wherein the screen switching means switches the display screen from the second display screen back to the first display screen, if the first determination means subsequently determines that the state of the first operation key changed from not operated to operated, and wherein said information is a series of video information based on a video signal, and the second display screen is a screen on which index images, for guiding scenes of said series of video information based on a video signal, are arranged in time series.

5. A method according to claim 4, further comprising:

a layer screen display step of displaying at least a screen in a first layer and a screen in a second layer lower than the first layer; and a layer switching step of switching the screen in the first layer and the screen in the second layer each other, based on a control signal from the remote control device, characterized in that the first display screen is the screen in the second layer, and the display screen is switched from the screen in the second layer to the second display screen if it is determined in the first determination step that the first operation key is operated, and when the display screen is the screen in the first layer, the display screen is switched from the screen in the first layer to a third display screen if it is determined in the first determination step that the first operation key is operated.

6. A method according to claim 4, characterized in that the remote control device includes a grip step of gripping a grip part by one hand, a first operation step of operating the first operation key provided at a position where the first operation key can be operated by a thumb finger when the grip part is gripped by one hand, and a second operation step of operating the second operation key provided at a position where the second operation key can be operated by a forefinger when the grip part is gripped by one hand.

* * * * *